United States Patent
McCormick

(10) Patent No.: US 11,615,142 B2
(45) Date of Patent: Mar. 28, 2023

(54) MAPPING AND QUERY SERVICE BETWEEN OBJECT ORIENTED PROGRAMMING OBJECTS AND DEEP KEY-VALUE DATA STORES

(71) Applicant: Salesforce, Inc., San Francisco, CA (US)

(72) Inventor: Michael McCormick, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 187 days.

(21) Appl. No.: 16/546,198

(22) Filed: Aug. 20, 2019

(65) Prior Publication Data
US 2020/0057781 A1 Feb. 20, 2020

Related U.S. Application Data

(60) Provisional application No. 62/720,064, filed on Aug. 20, 2018.

(51) Int. Cl.
*G06F 16/80* (2019.01)
*G06F 16/84* (2019.01)
*G06F 16/81* (2019.01)

(52) U.S. Cl.
CPC .............. *G06F 16/86* (2019.01); *G06F 16/81* (2019.01)

(58) Field of Classification Search
CPC ...................................................... G06F 16/86
See application file for complete search history.

(56) References Cited

U.S. PATENT DOCUMENTS

| | | | |
|---|---|---|---|
| 7,730,478 B2 | 6/2010 | Weissman | |
| 9,400,816 B1* | 7/2016 | Gubarev | G06F 16/2228 |
| 10,564,622 B1* | 2/2020 | Dean | G06F 16/27 |
| 2011/0289052 A1* | 11/2011 | Rambacher | G06F 16/1873 707/624 |
| 2012/0246202 A1* | 9/2012 | Surtani | G06F 16/289 707/812 |
| 2013/0151889 A1* | 6/2013 | Markus | G06F 16/22 707/703 |
| 2013/0275656 A1* | 10/2013 | Talagala | G06F 12/0246 711/103 |
| 2014/0081918 A1* | 3/2014 | Srivas | G06F 16/13 707/639 |
| 2014/0123136 A1* | 5/2014 | Beda, III | G06F 16/955 718/1 |
| 2014/0201244 A1* | 7/2014 | Zhou | G06F 16/00 707/803 |

(Continued)

OTHER PUBLICATIONS

Apache Hbase, "Welcome to Apache HBase™," Retrieved from https://hbase.apache.org/ on Aug. 20, 2019, 2 pages.

(Continued)

*Primary Examiner* — Mohammad S Rostami
(74) *Attorney, Agent, or Firm* — Nicholson, De Vos, Webster & Elliott, LLP

(57) ABSTRACT

A mapping and query service for mapping between object-oriented programming objects and deep key-value data stores. The service to implement a store operation for a mapping and query service that supports the storage of a set of one or more objects having classes and fields written in source code of an object-oriented programming language in a deep key-value data store.

21 Claims, 13 Drawing Sheets

(56) References Cited

U.S. PATENT DOCUMENTS

| | | | | |
|---|---|---|---|---|
| 2015/0134661 A1* | 5/2015 | Circlaeys | ............. | G06F 16/438 |
| | | | | 707/752 |
| 2015/0199424 A1* | 7/2015 | Damodaran | ......... | G06F 16/367 |
| | | | | 707/756 |
| 2016/0063021 A1* | 3/2016 | Morgan | ................ | G06F 16/182 |
| | | | | 707/754 |
| 2016/0275201 A1* | 9/2016 | Li | ......................... | G06F 16/221 |
| 2016/0299944 A1* | 10/2016 | Isaacson | ............. | G06F 16/2453 |
| 2017/0060941 A1* | 3/2017 | Yan | ...................... | G06F 16/148 |
| 2017/0178163 A1* | 6/2017 | Ramdeholl | ........ | G06Q 30/0203 |
| 2017/0192892 A1* | 7/2017 | Pundir | ................ | G06F 12/0873 |
| 2017/0300558 A1* | 10/2017 | Damodaran | ......... | G06F 16/332 |
| 2018/0018383 A1* | 1/2018 | Brunel | .................. | G06F 16/282 |
| 2019/0080036 A1* | 3/2019 | Dai | ......................... | G06F 30/18 |
| 2019/0087431 A1* | 3/2019 | Qiu | ......................... | G06F 16/13 |
| 2019/0370241 A1* | 12/2019 | Miraldo | .................... | H04L 9/32 |

OTHER PUBLICATIONS

Khurana A., "Introduction to HBase Schema Design," Networked Systems, vol. 37 (5), Oct. 2012, pp. 29-36.
Varley I., "HBase Schema Design," HBaseCon 2012, Salesforce, retrieved from https://www.slideshare.net/cloudera/5-h-base-schemahbasecon2012, May 25, 2012, 14 pages.

* cited by examiner

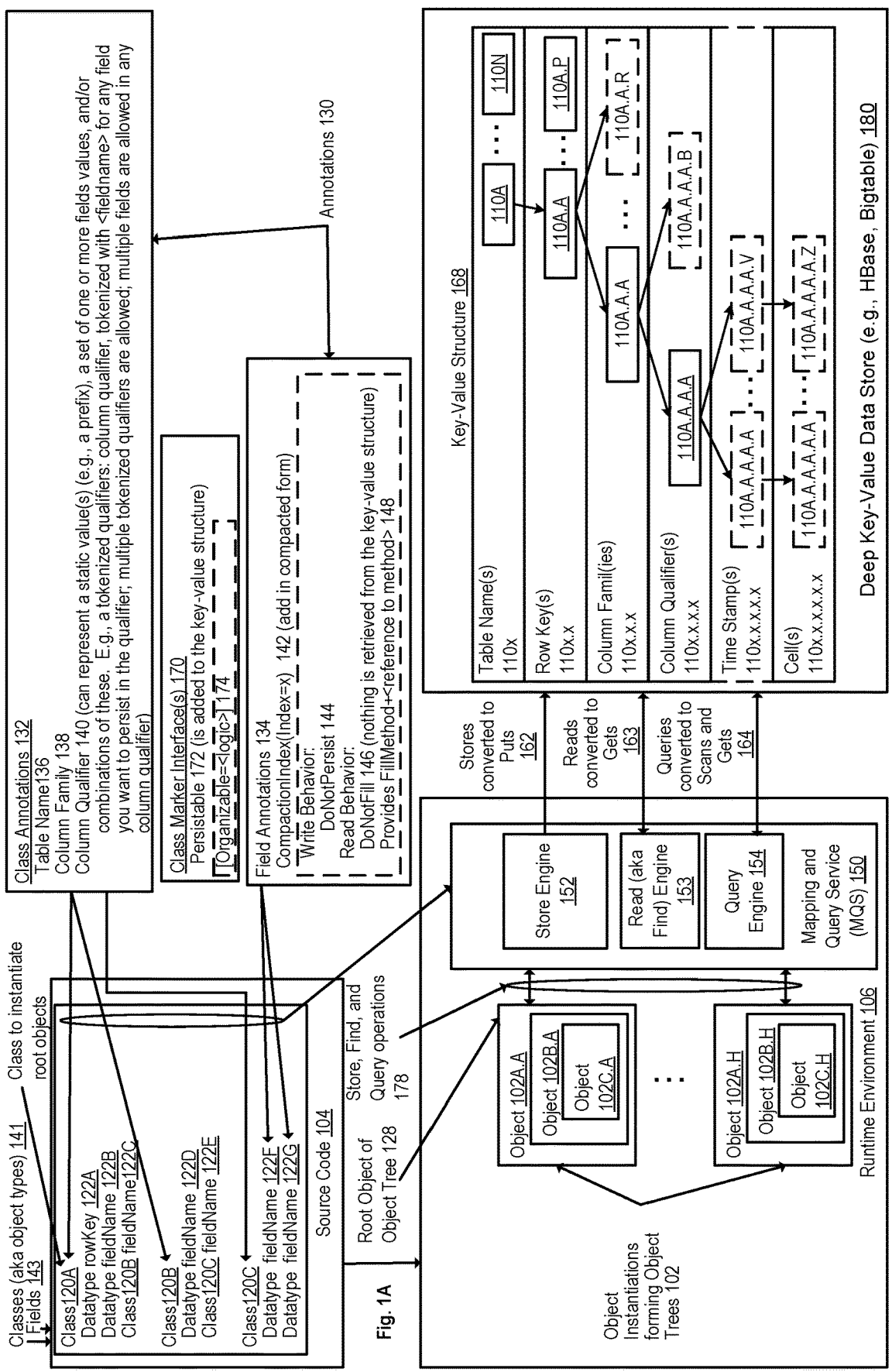

| Table Name 110x | Row Key 110x.x | Column Family 110x.x.x | Column Qualifier 110x.x.x.x | Time Stamp 110x.x.x.x.x | Cell 110x.x.x.x.x.x |
|---|---|---|---|---|---|
| Table1 | 00001 | Personal 184 | Name 192 | | Al.Smith |
| | | | Phone 194 | | 7201238877 |
| | | Office 186 | State 196 | | CO |
| | | | Phone 198 | | 7201238555 |
| | 00002 | Personal | Name | | Jo.Shaw |
| | | | Phone | | 7201231234 |
| | | Office | State | | CO |
| | | | Phone | | 7201232846 |
| | 00003 | Personal | Name | | Bo.Lee |
| | | | Phone | | 4151238877 |
| | | Office | State | | CA |
| | | | Phone | | 4151234343 |
| People1 | Person 1 | | First Name | | Fred |
| | | | Last Name | | Flintstone |
| People2 | Person 1 | | French First Name | | Frederique |
| | | | French Last Name | | Pierre à Briquet |
| | | | English First Name | | Fred |
| | | | English Last Name | | Flintstone |
| People3 | Person 1 | | First Name French | | Frederique |
| | | | Last Name French | | Pierre à Briquet |
| | | | First Name English | | Fred |
| | | | Last Name English | | Flintstone |
| Employer1 | Slate Rock and Gravel Company | | Name French | | Frederique.Pierre à Briquet |
| | | | Name English | | Fred.Flintstone |
| Employer | <employerId.employeeId> | <data> or <status> | c<employer.companyName> | | |
| | | | e<employee.employeeId> | | |
| | | | n | <timestamp> | <firstName>.<lastName> |

Fig. 1B

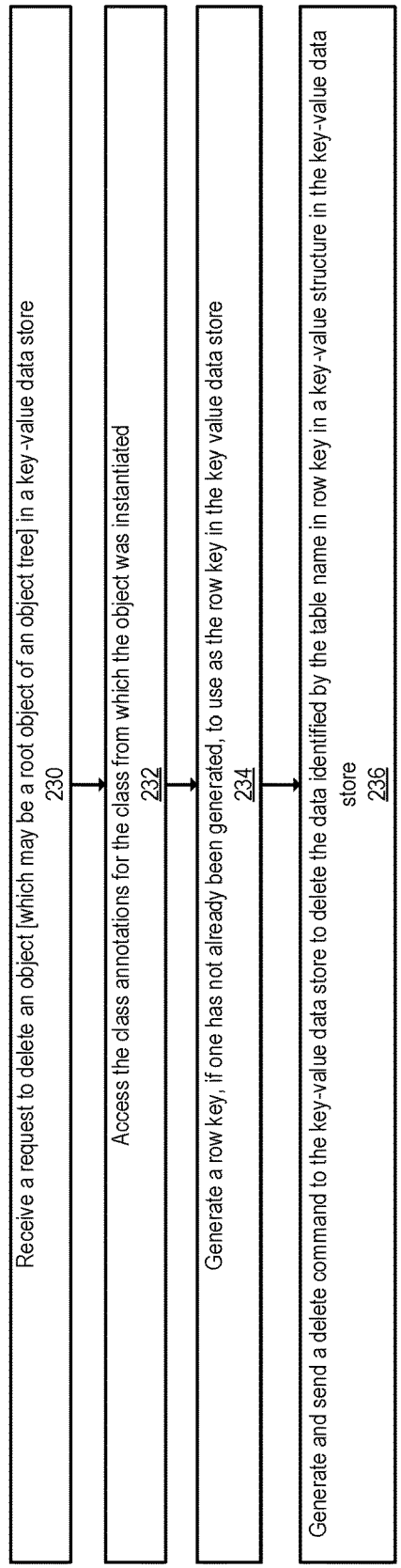

Fig. 2B

Receive a request to delete an object [which may be a root object of an object tree] in a key-value data store
230

Access the class annotations for the class from which the object was instantiated
232

Generate a row key, if one has not already been generated, to use as the row key in the key value data store
234

Generate and send a delete command to the key-value data store to delete the data identified by the table name in row key in a key-value structure in the key-value data store
236

FIG. 5

MAPPING AND QUERY SERVICE BETWEEN OBJECT ORIENTED PROGRAMMING OBJECTS AND DEEP KEY-VALUE DATA STORES

CROSS-REFERENCE TO RELATED APPLICATIONS

This application claims the benefit of U.S. Provisional Application No. 62/720,064, filed Aug. 20, 2018, which is hereby incorporated by reference.

TECHNICAL FIELD

One or more implementations relate to the field of databases; and more specifically, to a mapping and query service between object-oriented programming objects and deep key-value data stores.

BACKGROUND ART

Databases may be implemented according to a variety of different database models, such as relational, non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). Exemplary deep key-value stores (also referred to as key-value databases, key-value data stores, key-value datastores) are Apache HBase, Bigtable, and Oracle NoSQL database.

A database may comprise one or more database objects that are managed by a Database Management System (DBMS), each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). To provide an example, in the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs. In some implementations of a cloud database (a database that runs on a cloud platform and that is provided as a database service), identifiers are used instead of database keys, and relationships are used instead of foreign keys.

A database may be used to store programming objects (also referred to as "objects" and which should not be confused with database objects) used in object-oriented programming There are generally two ways objects are stored in a key-value database: 1) serialize the objects as bytes exactly as they are represented in memory; or 2) persist their scalar fields, and have a special scalar field in each which 'points' to other objects it relates to. For an object tree, this would mean each object has a field which points to its children and/or its parent via some sort of name or id stored in a scalar field inside the child/parent. Regardless, to store objects and object trees in a key-value database, a programmer needs to write custom code to persist objects into key-value format (e.g., in HBase, using put commands) to optimize system design and to map complex object trees into key-value structures in the key-value data store. To read the objects from the key-value data store, the programmer also needs to write custom code to query and reconstruct the objects and object trees (e.g., in HBase, using scan, scan with filter, and get commands) There is an HBase Java Client for use in this regard, but it does not alleviate the need to write the custom code.

Writing such custom code is time consuming and error-prone, and the custom code is hard to maintain over time. For example, to accommodate the addition a new field to a class, the custom code must be changed to reflect that change in the underlying schema of the deep key-value data store. For example, assume there is a class Names with fields firstName and lastName, and the custom code has been written to map this into and out of a key-value structure in a deep key-value store. Then, a new field called salutation is added to the class Names. The custom code must be edited to accommodate the change in the underlying schema of the key-value structure of the deep key-value store.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 1A illustrates a mapping and query service (MQS) for a deep key-value data store according to some exemplary implementations.

FIG. 1B is a table illustrating various exemplary key value pairs that may be used at the different level of a key-value structures according to some exemplary implementations.

FIG. 2B is a flow diagram for a delete engine of the mapping and query service 150 according to some exemplary implementations.

FIG. 2E is a flow diagram for the query engine 154 of the mapping and query service 150 according to some exemplary implementations.

DETAILED DESCRIPTION

Figure 2A:
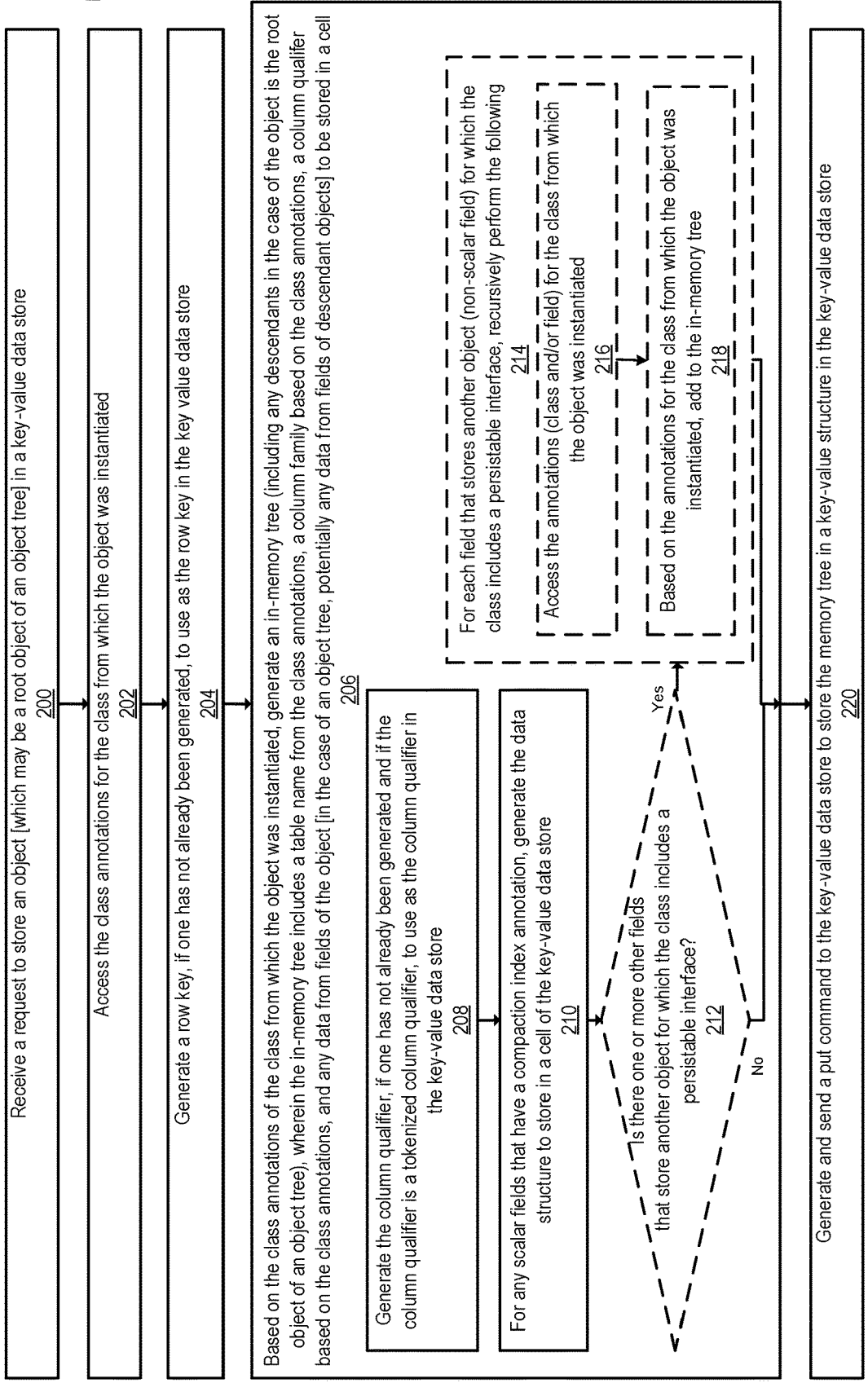
FIG. 2A is a flow diagram for the store engine 152 of the mapping and query service 150 according to some exemplary implementations.

The following description describes methods and apparatus for a mapping and query service (MQS) to map between objects used in object-oriented programming and key-value structures in a deep key-value database. The service supports the use of convenience classes and the annotating of objects (e.g., annotating particular aspects of objects, such as classes and fields) to indicate where in a deep key-value database the objects should be stored and retrieved. According to some exemplary implementations, classes (also known as object types) and fields are annotated with metadata so that the MQS knows how to store in and retrieve from the deep key-value non-relational database objects instantiated from the annotated classes and object trees. The annotations configure the reading and writing functionality without requiring programming specific to each object type. The annotations enable the MQS to query the stored data, and the annotations enable the MQS to infer the structure of an object when restoring the object's contents.

While Java Objects and Apache HBase are used in the exemplary implementations below, alternative implementations may use other object-oriented programming languages and/or other deep key-value data stores (e.g., Bigtable, Oracle NoSQL).

FIG. 1A illustrates a mapping and query service (MQS) for a deep key-value data store according to some implementations. Source code 104 includes classes (also known as object types) 141 including fields 143. A runtime environment 106 will instantiate objects during execution. If an object (or object tree) is to be stored in a key-value structure 168 of a deep key-value data store 180, the class (or classes in the case of an object tree) may be annotated with metadata (e.g., see annotations 130) for use by a mapping and query service (MQS) 150 to save (also referred to as store) and retrieve the object (or object tree) from the deep key-value data store 180. The "save" uses a method that is known by the non-relational database, e.g., the method may be a "put" 162 in HBase.

The annotations 130 include class annotations 132 and optionally field annotations 134. The class annotations 132 include a Table Name 136, a column family 138, and a column qualifier 140. The field annotations 134 include a compaction index 142, as well as in some implementations a DoNotPersist 144, a DoNotFill 146, and/or a ProvidesFillMethod 148. Also, FIG. 1A illustrates class marker interface(s) 170 that include Persistable 172, and in some implementations Organizable=<logic> 174.

By way of example, FIG. 1A shows: 1) class 120A including the fields rowKey 122A, fieldName 122B, and fieldName 122C, where fieldName 122C is of class 120B; 2) class 120B including fieldName 122D and fieldName 122E, where fieldName 122E is of class 120C; and 3) Class 120C, including fieldName 122F and fieldname 122G. Classes 120A-C form a hierarchy, where class 120A is a root, will be used to instantiate root objects of object trees, and includes the field rowKey 122A. Each of the classes 120A-C has class annotations 132 and the Persistable 172 class marker interface 170. Class 120C includes field annotations 134 for fieldName 122F and fieldName 122G. The runtime environment 106 will instantiate object trees 102 using the classes 120A-C responsive to other code (not shown) as is known in the art. Each of these object trees 102 will include: 1) a root object 128 (e.g., objects 102A.A-A.H) instantiated from class 120A, and thus will have a rowKey 122A; 2) a child object (e.g., objects 102B.A-B.H) instantiated from class 120B; and 3) 2) a grandchild object (e.g., objects 102C.A-C.H) instantiated from class 120C. In this example, the grandchild objects are the lowest level object in the object trees (and thus may be referred to as leaf objects). While FIG. 1A illustrates 3 classes, a 3 level class hierarchy, corresponding objects, and field annotations on only the fields of the leaf class 120C, this is to provide an example. Thus, the system of FIG. 1A may support more, less, and/or different classes, class hierarchies, numbers of levels in a given class hierarchy (including a single level, which in essence is not a hierarchy), fields in a given class, fields with field annotations, objects, and/or object trees. In some implementations, each of the classes (e.g., classes 102A-C) in a class hierarchy that includes annotations have a Table Name 136, a column family 138, and a column qualifier 140, where the Table Name 136 is the same value across the classes in the class hierarchy, but different ones of these classes have different column family name(s) and/or column qualifier(s).

FIG. 1A illustrates a logical representation how the objects (and/or object trees) are stored in the key-value structure 168 of the deep key-value data store 180 according to some implementations. Again, using Hbase as an example of a deep key-value store, each value is actually a key to the next layer down (e.g., Key "A"→Value "B"; Key "B"→Value "C"; etc.). This forms a hierarchy that is logically represented as a directed graph (e.g., a tree) in FIG. 1A, where each key value pair is represented by one or more links between parent and child nodes. When the value of a key value pair is a single value, there is one link; however, when the value of a key value pair included more than one value, it forms a link for each value. In particular, FIG. 1A illustrates a hierarchy of table name(s) 110$x$ (also referred to as group names), row key(s) 110$x.x$ (also referred to as top-level keys or first level keys), column famil(ies) 110$x.x.x$ (also referred to as second level key(s)), column qualifier(s) 110$x.x.x.x$ (also referred to as third level key(s)), optional time stamp(s) 110$x.x.x.x.x$ (also referred to as fourth level key(s)), and cell(s) 110$x.x.x.x.x.x$ (also referred to as fifth level key(s), or fourth level key(s) if the time stamps are not implemented). As discussed above, the key of a key value pair at a lower level of the hierarchy is the value of a key value pair in the next higher level of the hierarchy. Put another way, considering a current key value pair of a current level of the hierarchy: 1) the key of the current key value pair is the value of a key value pair of the next higher level of the hierarchy if there is one; and 2) the value of the current key value pair is the value of a key value pair of the next higher level of the hierarchy (if there is one). For example, where the current level is the column qualifier(s) 110$x.x.x.x$, the key and value of a current key value pair at that level are respectively: 1) a value of a key value pair at a next higher level (e.g., in the column famil(ies) 110$x.x.x$); and 2) a key of a key value pair a the next lower level (e.g., the time stamp(s) 110$x.x.x.x.x$ if implemented, otherwise in the cell(s) 110$x.x.x.x.x.x$).

In some implementations, store, find, and query operations 178 issued by code (not shown) to the MQS 150 cause the MQS 150 to store to and retrieve from (e.g., find (and reconstruct) and/or query (and reconstruct)) the deep key-value data store 180 objects and/or object trees. In FIG. 1A, the MQS 150 includes a store engine 152, a read (aka find) engine 153, and a query engine 154 to respectively respond to store, find, and query operations by respectively generating puts 162, gets 163, and scans and gets 164 according to the annotations 130. These puts 162, gets 163, and scans and gets 164 are submitted to the deep key-value data store 180; and in the case of gets and scans, the results provided by the deep key-value data store 180 are used, along with the annotations 130, to reconstruct the objects (and object trees). More specifically, on a store operation for a given root object: 1) the Table Name 136 is used to select (or create if it does not already exists) a table name 110x; 2) the rowKey 122A is generated (described in more detail below) to select (or create if it does not already exists) a row keys 110x.x; 3) the column family 138 is used to select (or create if it does not already exists) a column family 110x.x.x; 4) the column qualifier 140 is used to select (or create if it does not already exists) a column qualifier 110x.x.x.x; 5) a timestamp, if implemented, is generated (described in more detail later herein) and stored in time stamps 110x.x.x.x.x; and 6) the contents of zero or more fields (e.g., fields 122F-G) are stored in zero or more cells 110x.x.x.x.x.x.

In one implementation, each of the table(s) 110A-110N is a String (e.g., a fixed String —like a relational database table name). As illustrated, the row keys 110x.x are written to (are grouped under) different ones of the tables 110x (e.g., row keys 110A.A-110A.P are organized under table 110A). The row keys are lexicographically sorted by HBase, allowing for relatively fast lookups based on key prefixes. Requests for a row specify the table and row key (which may be a prefix). Even though they are called "Rows" they are not. They are really just the highest level key.

The column famil(ies) 110x.x.x are next level down in the hierarchy, and in one implementation, is a String (e.g., a fixed String) used by the HBase system to group the column qualifier(s) 110x.x.x.x. How qualifiers are grouped has impact on the performance of scans (reads). Column families can be considered as fixed physical "routes" for all the column qualifiers 110x.x.x.x and cells 110x.x.x.x.x.x beneath. Even though the term column is used, in some implementations it is not—the column famil(ies) 10x.x.x are the first value(s) pointed to by the row key. The column qualifier, like the row key, is defined by the programmer. The column qualifier, like the row key, acts as a key to the next level down.

In some implementations, column family names and/or column qualifiers may include prefixes. For example, a column qualifier may include a prefix (e.g., c, e, or n) and/or data (e.g., the contents of one or more fields). When both a prefix and data are included, some implementations include the prefix concatenated with the data. In some implementations, each of the classes with annotations has a unique combination of column family names and column qualifiers for a given table name. In fact, in some implementations that use prefixes, each of the classes with annotations has a unique combination of a prefix in each of one or more family names and a prefix in each of the one or more column qualifiers. In some such implementations, the MQS 150 inspects the column family names and column qualifiers in the annotations of the classes to build a mapping that identifies for those classes the combinations of the prefixes in the column family names and the prefixes in the column qualifiers of those family names. This mapping is used when retrieving objects from the key-value data store to determine the classes of the objects as described below.

If the timestamp(s) 110x.x.x.x.x are implemented, they are the next level down. These are written (usually by the system, but optionally by the user) when the value of the corresponding cell 110x.x.x.x.x.x is stored. Thus, in some implementations, every time a cell value is updated, another timestamp is created as the key to that cell value. When the table is defined, the number of versions allowed on a cell is set (e.g., at the column family level). A request to retrieve a cell value defaults to the latest version, so the timestamp key is implied and provided by the system based on an ordered index, so they do not need to be considered keys themselves.

The cell(s) 110x.x.x.x.x.x are the lowest level. Each cell's content is defined by the programmer as described later herein.

FIG. 1B is a table illustrating various exemplary key value pairs that may be used at the different levels of the key-value structures according to some exemplary implementations. The top row of the table is a header row that names the columns with the levels of the hierarchy in FIG. 1A. To illustrate that some levels of the hierarchy group items within the next lower level of the hierarchy, cells of the table have been merged. In the first example, "Table1" is used as the table name 110x, and it spans 3 sub rows of row key 110x.x. because it groups 3 row keys 110x.x (00001, 00002, and 0003). The sub row of the table in FIG. 1B for row key 00001 spans 2 sub rows of column family 110x.x.x (Personal and Office). Thus, 00001 and Personal, Office are respectively the key and value of a key value pair at the row key 110x.x level of the hierarchy, while each of Personal and Office are also a key of a key value pair at the column family level of the hierarchy.

Thus, an object may be stored in one row that is identified through a row key, and that row may comprise multiple column families, such as Personal 184 and Office 186. Each column family may include multiple column identifiers such as Name 192 and Phone 194 in Personal 184, and State 196 and Phone 198 in Office 186. Each column identifier includes a cell that may contain a value. The value may be a single value like the values for the state 196 and phone numbers 194/198; or the value may be compacted metadata including multiple values such as a first name and a last name compacted using a delimiter in name 192. When implemented, the timestamps may be a modeled dimension within a non-relationship database row. The numerous examples in the Table of FIG. 1B are referred to later here.

Once the objects are stored in the deep key-value data store 180, they may be retrieved using a query engine 154 within the MQS 150. The query engine converts an object query request into a retrieval method that is known by the deep key-value data store; the retrieval method may be a "scan" and "get" 164 in HBase. The key-values read from the deep key-value data store 180 are used to reconstruct the object(s) (and object trees) that the object query requested.

Using the MQS 150, a user does not need to know how and where an object will be stored in a deep key-value data store when the user saves the object. The MQS converts the saving of an object to a method to store known by the deep key-value data store based on the annotations. When the user queries one or more objects within the deep key-value data store, the user does not need to know how and where an object is stored in the deep key-value data store either. The MQS 150 converts the query to a method to retrieve known to the deep key-value data store. Using the MQS 150, the mapping of objects (and object trees) to key-values within a deep key-value data store is no longer a manual operation, and no custom code needs to be written for saving objects into the deep key-value data store and for querying objects stored within the deep key-value data store. The MQS 150 thus improves the efficiency of mapping objects to key-values stored within the deep key-value data store.

The annotations 130 indicate how and where in the deep key-value data store a corresponding object should be stored to and retrieved from.

In one implementation, the column qualifier 140 may be a tokenized qualifier: column qualifier, tokenized with <fieldname> for any field you want to persist in the qualifier; multiple tokenized qualifiers are allowed; multiple fields are allowed in any column qualifier. Persistable 172 (also referred to as a persistable indicator) indicates to the MQS 150 that the object should be persisted (that is, stored in the deep key-value data store 180). DoNotPersist 144 means the field will not be persisted. Compaction indicates that the content of the field is to be compacted into the cell 110x.x.x.x.x.x with the values of other fields, which in some implementations is implemented as a CompactionIndex 142, with the value unique and sequential across all the other CompactionIndex 142 annotated fields in the class (e.g., starting with 0)). If a field does not get included in the tokenizedQualifier or in the compaction metadata, it will not be persisted. DoNotFill 146 on a given field indicates to the MQS 150 that the MQS 150 (e.g., the read engine 153 and/or the query engine 154) is to skip populating that field when reading and reconstructing an object containing that field from the deep key-value data store 180 ProvidesFillMethod 148, along with a reference to a method, indicates that the query engine 154 is to apply custom processing to the population of a field when reading. In other words, this is an annotation which names the method in the class which handles "filling" a field during read if it's non-standard (e.g., requires special logic or behavior). Organizable 174, along with logic to provide to an organizeMethod, indicates that how, after all reads are complete, the object is to organize itself in relation to the other read objects. In other words, this is an interface on the class. If a class implements Organizable, it provides a method called "Organize" which MQS will call on it after all the objects have been read in (e.g., it may accept all object of a particular class and places them into their correct place in an object tree).

The MQS 150 allows for: 1) the mapping of a complex object tree to a deep key-value store through simple annotations and convenience classes; 2) querying using metadata (class, field, expression) instead of specific code for each kind of query; 3) hides the implementation details of the data store (e.g., HBase) from the programmer/user, unless programmer/user needs to override something directly; and 4) changes to the storage model to be made by updating the annotations.

In some implementations, the table name is a string and composed of characters that are safe for use in a file system path. Within a table, data is stored according to its row. Rows are identified uniquely by their row key. Row keys are the highest-level keys, and they may be lexicographically sorted, allowing for fast lookups based on key prefixes. In one implementation, row keys do not have a data type and are treated as a byte array (byte [ ]).

Data within a row is grouped by column family Column families may impact the physical arrangement of data stored in a non-relational database. Column families are strings and composed of characters that are safe for use in a file system path. Data within a column family are addressed via its column qualifier ("column") While a column family are often defined up front and are not easily modified, a column qualifier need not be specified in advance. Column qualifiers need not be consistent between rows. Like row keys, column qualifiers do not have a data type and are treated as a byte array in one implementation.

Within a table name 110x, a combination of row key, column family, and column qualifier (and time stamp if implemented) uniquely identifies a cell. The data stored in a cell is referred to as the cell's value. In one implementation, the values do not have a data type and are treated as a byte array.

Values within a cell may be versioned. Versions are identified by their version number, which may be the timestamp of when the cell was written. If a timestamp is not specified during a write, the current timestamp may be used; and if the timestamp is not specified for a read, the latest is returned. The number of cell value versions retained by a deep key-value data store may be configured for each column family, and the default number of cell versions is three in one implementation.

An exemplary schema for a table of a deep key-value data store is the following:

```
Table: fixed string
    Row Key: variable byte [ ]
        Column Family: fixed string, plus maximum number of cell versions allowed
            Column Qualifier: variable byte[ ]
                Timestamp: set when cell value is written
                    Cell: variable byte[ ]
```

Because keys are also values, they may do two things: 1) provide information that applies to all the values underneath; and 2) providing specific information relating to their parent. For example, one table in a deep key-value data store may include the following data for a person named Fred Flintstone:

```
Row Key: "Person 1"
    Column Qualifier: "First Name"
        Cell Value : "Fred"
    Column Qualifier: "Last Name"
        Cell Value : "Flintstone"
```

Now assume Fred has a different first and last name in France, and the data may be stored as the following:

```
Row Key: "Person 1"
    Column Qualifier: "French First Name"
        Cell Value : "Frederique"
    Column Qualifier: "French Last Name"
        Cell Value : "Pierre à Briquet"
    Column Qualifier: "English First Name"
        Cell Value : "Fred"
    Column Qualifier: "English Last Name"
        Cell Value : "Flintstone"
```

Or re-order the column qualifiers:

```
Row Key: "Person 1"
    Column Qualifier: "First Name French"
        Cell Value : "Frederique"
    Column Qualifier: "Last Name French"
        Cell Value : "Pierre à Briquet"
    Column Qualifier: "First Name English"
        Cell Value : "Fred"
```

-continued

> Column Qualifier: "Last Name English"
> Cell Value : "Flintstone"

In this example, column qualifiers are lexicographically sorted (within the column family to which they belong). If one expects to search more often by language, she would choose the former; and if expecting to search more by first or last name, she would choose the latter.

In one implementation, multiple values may be compacted together into a cell through compaction (e.g., using a delimiter (•)). The compacted cell contains compacted metadata. For instance:

> Row Key: "Slate Rock and Gravel Company"
> Column Qualifier: "Name French"
>     Cell Value : "Frederique.Pierre à Briquet"
> Column Qualifier: "Name English"
>     Cell Value : "Fred.Flintstone"

In this example, an employer is used as the row key, and the first and last name are compacted together into the cell, using a delimiter (•); and thus, there is compacted metadata.

A user may manipulate data within a deep key-value data store through an application programming interface (API). For example, HBase uses three primary methods to manipulate data: Get, put, and Scan. Gets and Puts are specific to particular rows and need the row keys to be provided. Scans can be done over a range of rows. The range can be defined by a start and stop row key or could be the entire table if no start and stop row keys are defined.

The annotations 130 and the MQS 150 provides for a declarative way to map each level of a class hierarchy to our HBase key/value structures, including being able to write, read, and query efficiently.

By way of example, the classes 120A-C may be:

> Employer
>     Byte[ ] rowKey
>     String companyName
>     Employee employee
> Employee
>     EmployeeId
>     Map<Language, Names> localizedNames
> Names
>     firstName
>     lastName An object generated from this class may be represented as:

> Employer
>     rowKey
>     companyName
>     Employee
>         employeeId
>         Names
>             firstName
>             lastName In some implementations the row key is manually calculated and defined outside of MQS 150. It is stored on a root object and used to directly query that root object (and implicitly thereby all of its children). For instance, in the case of the Employer object above, the Employer object would be a root object and have a root key provided at run time. In an alternative implementation, annotations are added to fields in the source code to define the rowkey. Below are some examples:

> Employer
>     @compositeKeyIndex=0
>     String companyName
> Employee
>     @compositeKeyIndex=1
>     String employeeId
> Names
>     @compositeKeyIndex=2
>     String firstName
> indicates a row key composed of <employerId><personId><createdTime>

FIG. 2A is a flow diagram for the store engine 152 of the mapping and query service 150 according to some exemplary implementations. The store engine 152 receives a request to store an object, which may be a root object of an object tree, in a key-value data store 180 (Block 200). The store engine 152 access the class annotation for the class from which the object was instantiated (Block 202). The store engine 152 generates a row key (e.g., to store in the rowKey field), if a row key has not already been generated, to use as the row key in the key value data store 180 for the received object (Block 204).

Based on the class annotations of the class from which the received object was instantiated, the store engine 152 generates an in memory tree including any descendants (i.e., children) in the case where the received object is the root object of an object tree. The in memory tree includes a table name from the class annotations, a column family based on the class annotations, a column qualifier based on the class annotations, and any data from fields of the object to be stored in a cell (Block 206). In the case of an object tree, there may potentially be data from fields of descendant objects.

This process of Block 206 is further implemented by generating a column qualifier, if one has not already been generated, and if the column qualifier is a tokenized column qualifier, to use as the column qualifier in the key-value data store for the object (Block 208). The store engine 152 generates the data structure to store any scalar fields that have a compaction index annotation (Block 210). The store engine 152 determines whether there is one or more other fields that store another object for which the class includes a persistable interface (Block 212).

If there are such fields, then for each field that stores another object (non-scalar field) for which the class includes a persistable interface, then the store engine recursively performs the following steps (Block 214). The store engine 152 accesses the annotations (class and/or field) for the class from which the object was instantiated (Block 216). The store engine 152 also adds to the in memory tree based on the annotations for the class from which the object was instantiated (Block 218).

In the case where there were not more fields that stored another object for which the class includes a persistable interface or after they are handled, then the store engine 152 generates and sends a put command to the key-value data store to store the in memory tree in a key-value structure in the key-value data store (Block 220).

FIG. 2B is a flow diagram for a delete engine of the mapping and query service 150 according to some exemplary implementations. The delete engine receives a request to delete an object, which may be a root object of an object tree, in a key-value data store (Block 230). The delete engine accesses the class annotations for the class from which the object was instantiated (Block 232). The delete engine generates a row key, if one has not already been generated, to use as the row key in the key-value data store (Block 234). The delete engine then generates and sends a delete command to the key-value data store to delete the data identified by the table name in the row key in a key-value structure in the key-value data store (Block 236).

Figure 2C:
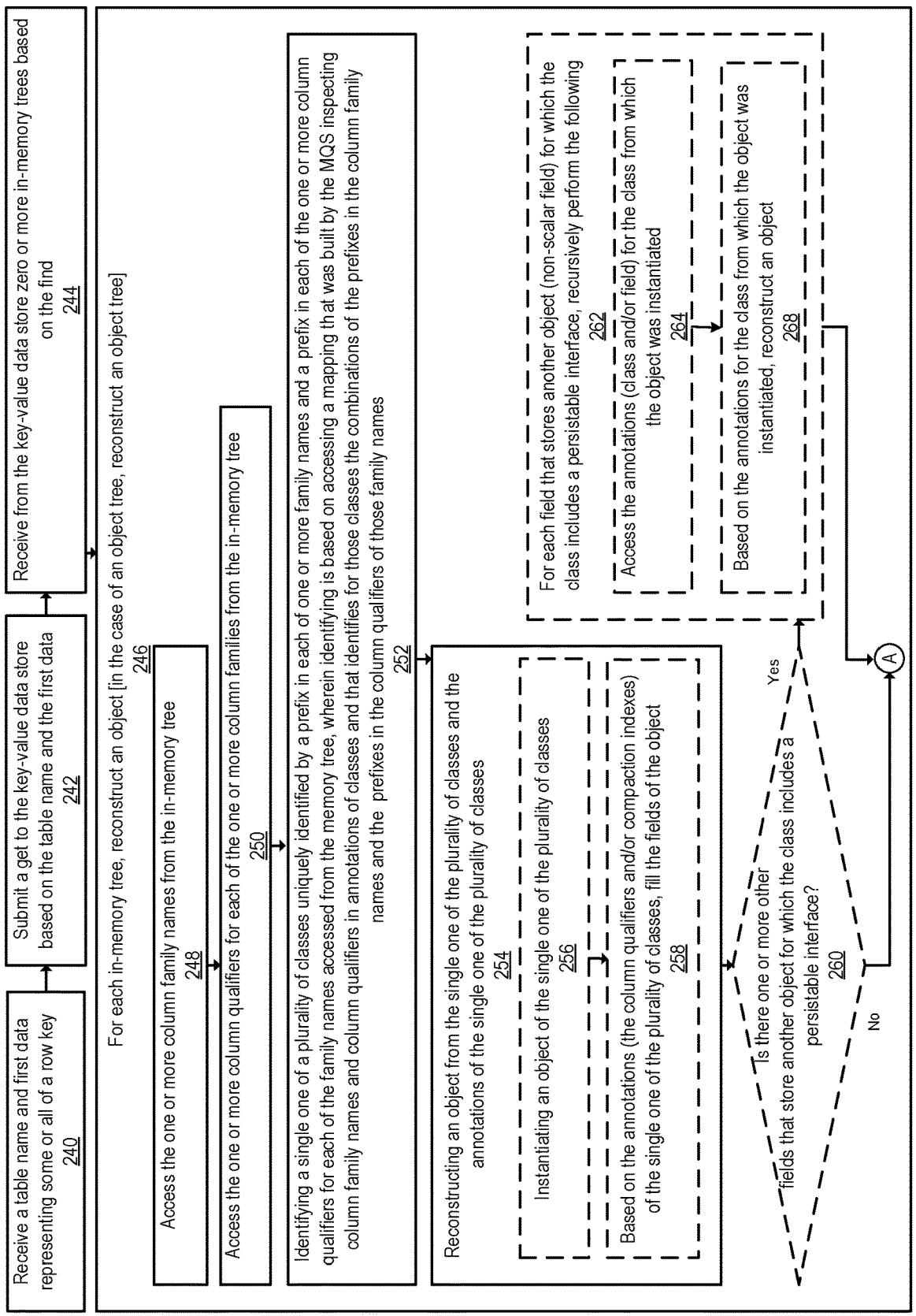
FIG. 2C is part of a flow diagram for the read engine 153 of the mapping and query service 150 according to some exemplary implementations.

FIG. 2C is part of a flow diagram for the read engine 153 of the mapping and query service 150 according to some exemplary implementations. The read engine 153 receives a table name and a first data representing some or all of a row key (Block 240). The read engine 153 submits a get to the key-value data store 180 based on the table name and the first data (Block 242). The read engine 153 receives from the key-value data store 180 zero or more in-memory trees based on a find initiated by the get (Block 244). The read engine 153, for each in-memory tree, reconstructs an object (Block 246). In the case of an object tree, the read engine 153 reconstructs an object tree 246.

The reconstruction process of the read engine 153 can include accessing the one or more column family names from the in-memory tree (Block 248). The read engine 153 accesses the one or more column qualifiers for each of the one or more column families from the in-memory tree (Block 250). The read engine identifies a single lone of a plurality of classes uniquely identified by a prefix in each of one or more family names and a prefix in each of the one or more column qualifiers for each of the family names accessed from the in-memory tree (Block 252). Identifying the classes is based on accessing a mapping that was built by the MQS inspecting column family names an column qualifiers in annotations of classes and that identifies for those classes the combinations of the prefixes in the column family names and the prefixes in the column qualifiers of those family names (Block 252).

The read engine 153 reconstructs an object from the single one of the plurality of classes and the annotations of the single one of the plurality of classes (Block 254). This reconstruction can include instantiating an object of the single one of the plurality of classes (Block 256) and based on the annotations (e.g., the column qualifiers and/or compaction indexes) of the single one of the plurality of classes, filling the files of the object (Bock 258).

The read engine 153 can determine whether there is one or more other fields that store another object for which the class includes a persistable interface (Block 260). If there are one or more such fields, then the read engine 153 performs a recursive function for each field that store another object (i.e., a non-scalar field) for which the class includes a persistable interface (Block 262). This recursive process accesses the annotation (e.g., class and/or field) for the class from which the object was instantiated (Block 264). The read engine 153 reconstructs the object based on the annotations for the class from which the object was instantiated (Block 268).

Figure 2D:
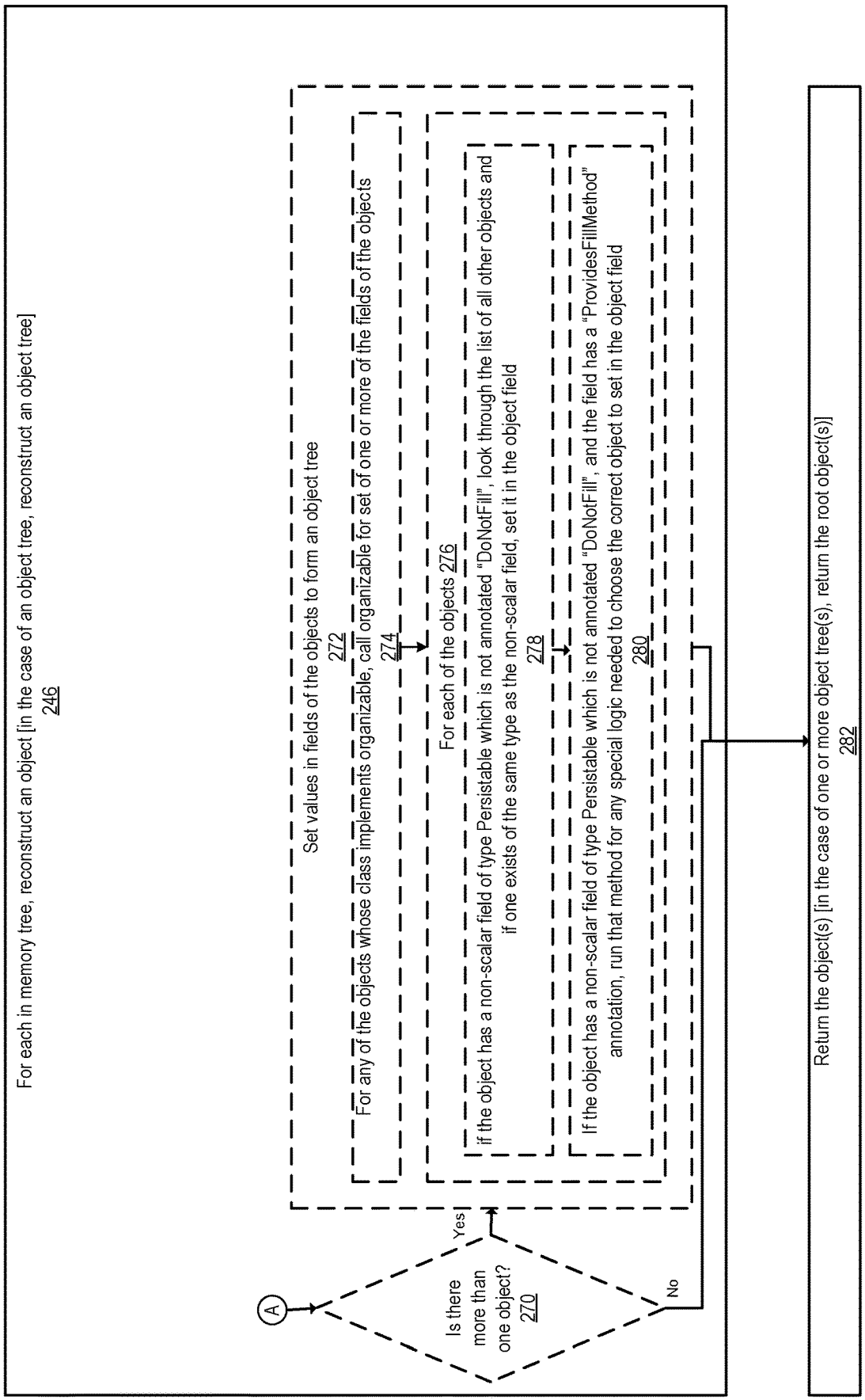
FIG. 2D is the remainder of the flow diagram for the read engine 153 of the mapping and query service 150 according to some exemplary implementations.

FIG. 2D is the remainder of the flow diagram for the read engine 153 of the mapping and query service 150 according to some exemplary implementations. If no fields with persistable interfaces were present or after the recursive process completes, the read engine 153 reconstructs the object for each in-memory tree (Block 246). In the case of an object tree, the read engine 153 reconstructs and object tree. This further reconstruction can include determining whether there is more than one object (Block 270). If there is more than one object, then the process sets values in fields of the object to form an object tree (Block 272). Setting the fields can include, calling an organizable to set one or more of the fields of the object for any objects whose class implements 'organizable' (Block 274). For each of the objects (Block 276), the read engine 153 looks through the list of all other objects and if one exists of the same type as the non-scalar field, sets the field in the object if the object has a non-scalar field of type Persistable which is not annotated "DoNotFill." If the object has a non-scalar field of type Persistable that is not annotated "DoNotFill" and the field has a "ProvidesFillMethod" annotation, the read engine runs that method for any special logic needed to choose the correct object to set in the object field (Block 280).

If there is not more than one object or the processing of an object tree has completed, then the read engine 153 returns the object(s) and the read completes (Block 282). If the case of one or more object tree(s), the root object(s) may be returned.

FIG. 2E is a flow diagram for the query engine 154 of the mapping and query service 150 according to some exemplary implementations. The query engine 154 receives a request including a list of class, field, and expression (Block 284). The query engine 154 inspects each element in the list to see where in a key-value structure of the key-value store the field is stored (e.g., qualifier or cell) to create a set of one or more filters for searching in the particular location (Block 286). The query engine 154 generates and submits a scan with the set of filters to the key-value data store (Block 288). The query engine 154 receives from the key-value data store zero or more row keys (Block 290).

The query engine 154 generates and submits a set of one or more finds using the row keys to the key-value data store (Block 292). The query engine 154 receives from the key-value data store zero or more in-memory trees based on the find(s) (Block 294). The query engine 154 reconstructs an object for each in-memory tree (Block 296). In the case of an object tree, the object tree is reconstructed. The query engine 154 returns the reconstructed objects (Block 298). In the case of one or more object tree(s), then the root object(s) are returned.

Figure 3:
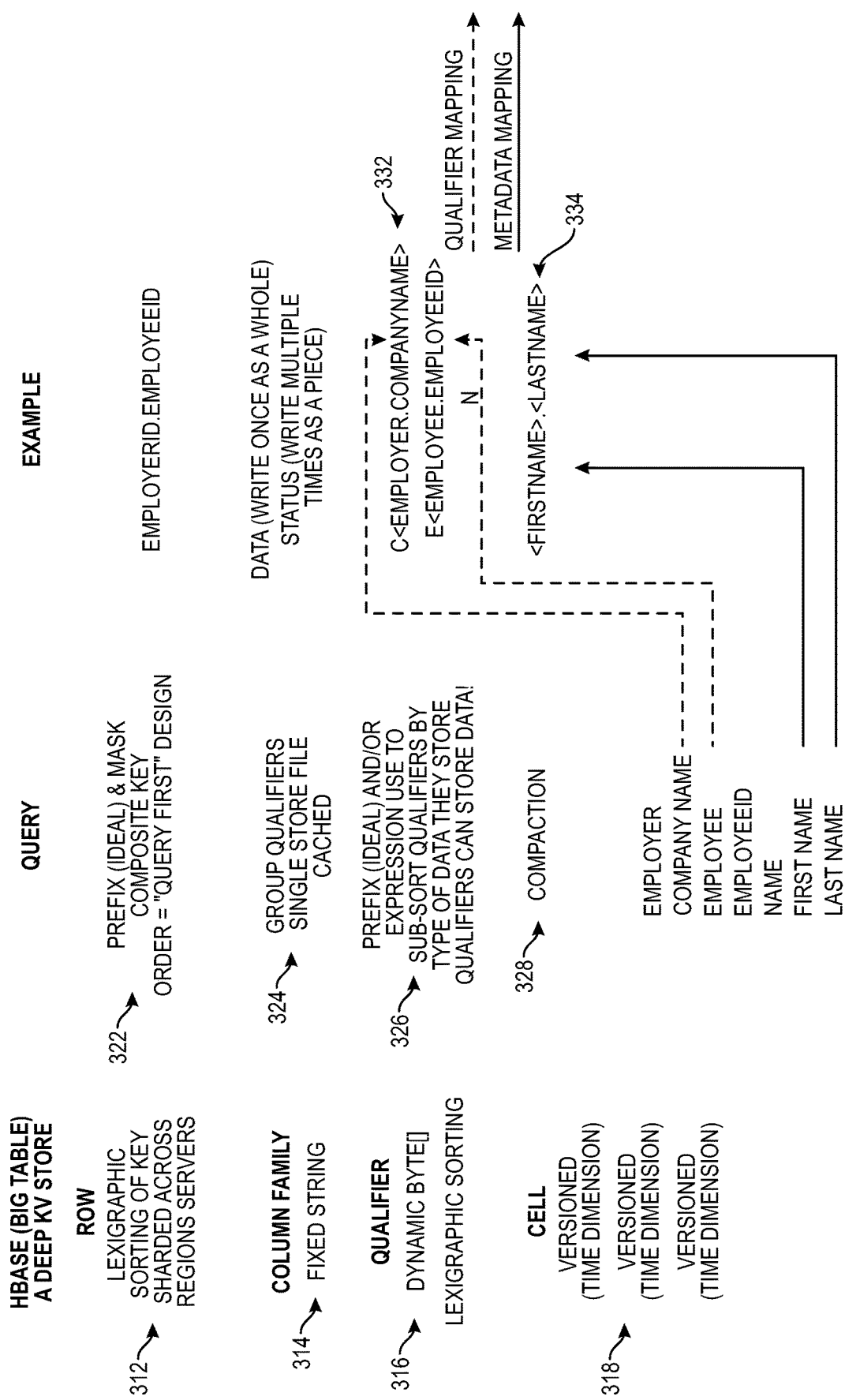
FIG. 3 is a block diagram illustrating the deep key value store, Query, and an example according to some exemplary implementations.

By way of a more specific exemplary implementation, assuming the following classes, the last row in the Table of FIG. 1B illustrates an exemplary schema according to some implementations, while FIG. 3 is a block diagram illustrating the deep key-value store, Query, and an example according to some exemplary implementations.

```
Employer
    Byte[ ] rowKey
    String companyName
    Employee employee
Employee
    EmployeeId
    Map<Language, Names>localizedNames
Names
    firstName
    lastName
```

An object generated from this class may be represented as:

```
Employer
    rowKey
    companyName
    Employee
        employeeId
        Names
            firstName
            lastName
```

In FIG. 3, a column qualifier 316 may include a prefix (e.g., c, e, or n) and/or data (e.g., the contents of one or more fields). As shown at 322, the prefixes c and e are respectively concatenated with employer.companyName and employee.employeeId. In contrast, the prefix n is not concatenated with anything, but instead the firstName and lastName are compacted at reference 334.

Figure 4:
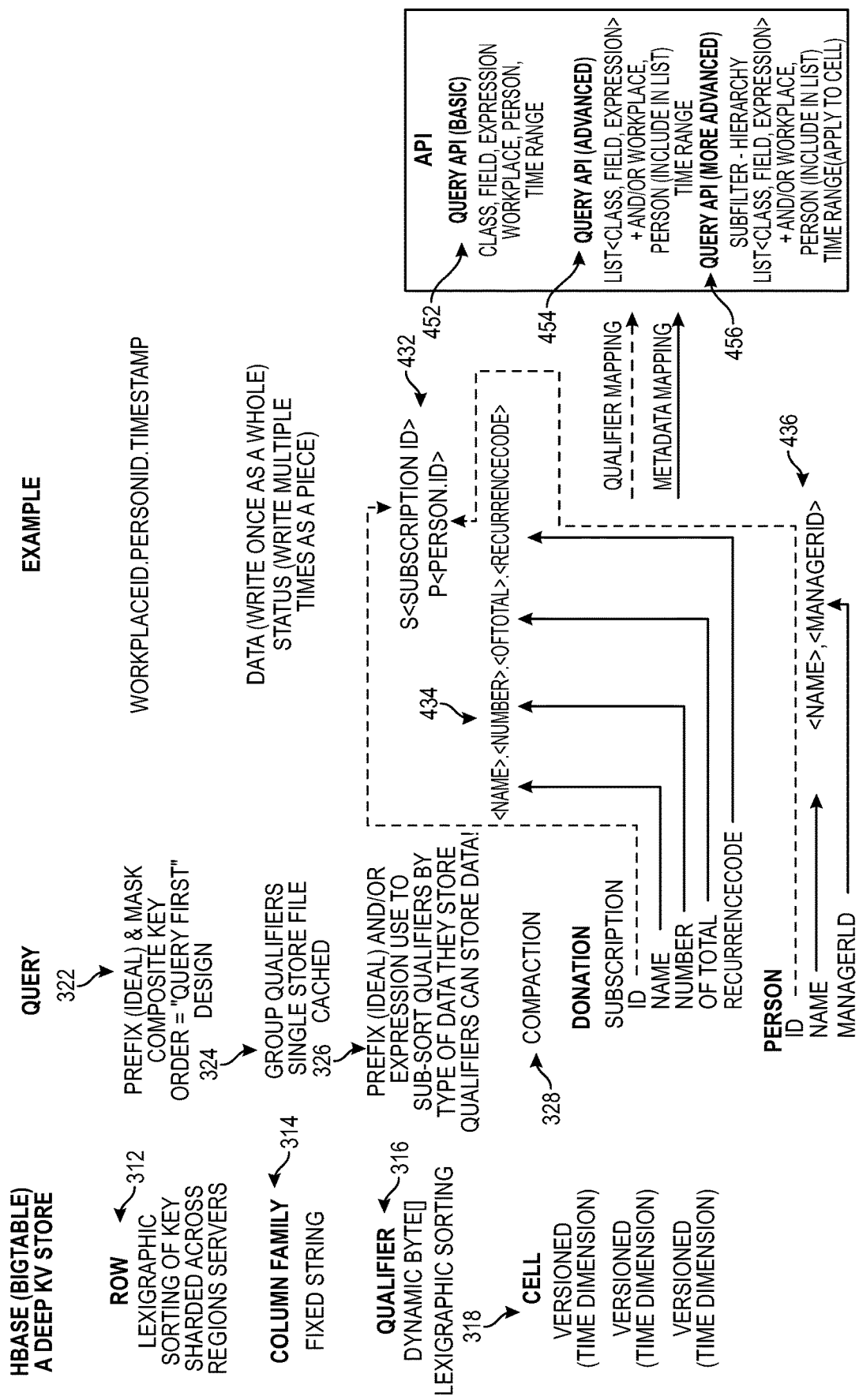
FIG. 4 is a block diagram illustrating the deep key value store, Query, and a second example according to some exemplary implementations.

FIG. 4 is a block diagram illustrating the deep key value store, Query, and a second example according to some exemplary implementations. FIG. 4 include many of the same element as FIG. 3, and these elements have the same reference numbers. In FIG. 4, an object tree having at a first level object (e.g., aDonation object) and having two second level objects (e.g., a Subscription Object and a Person Object), may have a column qualifier with a prefix (e.g., s or p) concatenated with a field (e.g., subscription.id or person.id) from one of the second level objects at reference 432; where a cell 434 may be a compaction of fields from one of the second level objects (e.g., name, number, ofTotal, recurrenceCode). The query interfaces (API) to query objects stored in a non-relational database are listed with increased complexity at references 452-456.

Note that one or more marker interfaces (e.g., Organizable 174) can provide resource-specific processing either before persistence or during retrieval (e.g., relating and/or sorting multiple objects together into a tree or a list). In some implementations, the query interface allows for specifying object(s), field(s), a matching of the fields to a regular expression (e.g., combinations of these can be ANDed and ORed in a hierarchy, supporting fully-dynamic queries).

In some implementations, the above discussed convenience class may be, for example, the repository class. In some implementations, a top-level (root) object is created by extending the repository class ("Repo class"). The repository class declares three things about an object structure in one implementation: (1) the table name; (2) the column family names; and (3) the column qualifier prefixes. (1) and (2) are used by the MQS 150 to construct, validate, or update the schema in the non-relational database. (2) and (3) are used by the objects to declare how and where their scalar fields should be stored. A field is a scalar field or another data object.

Figure 5:
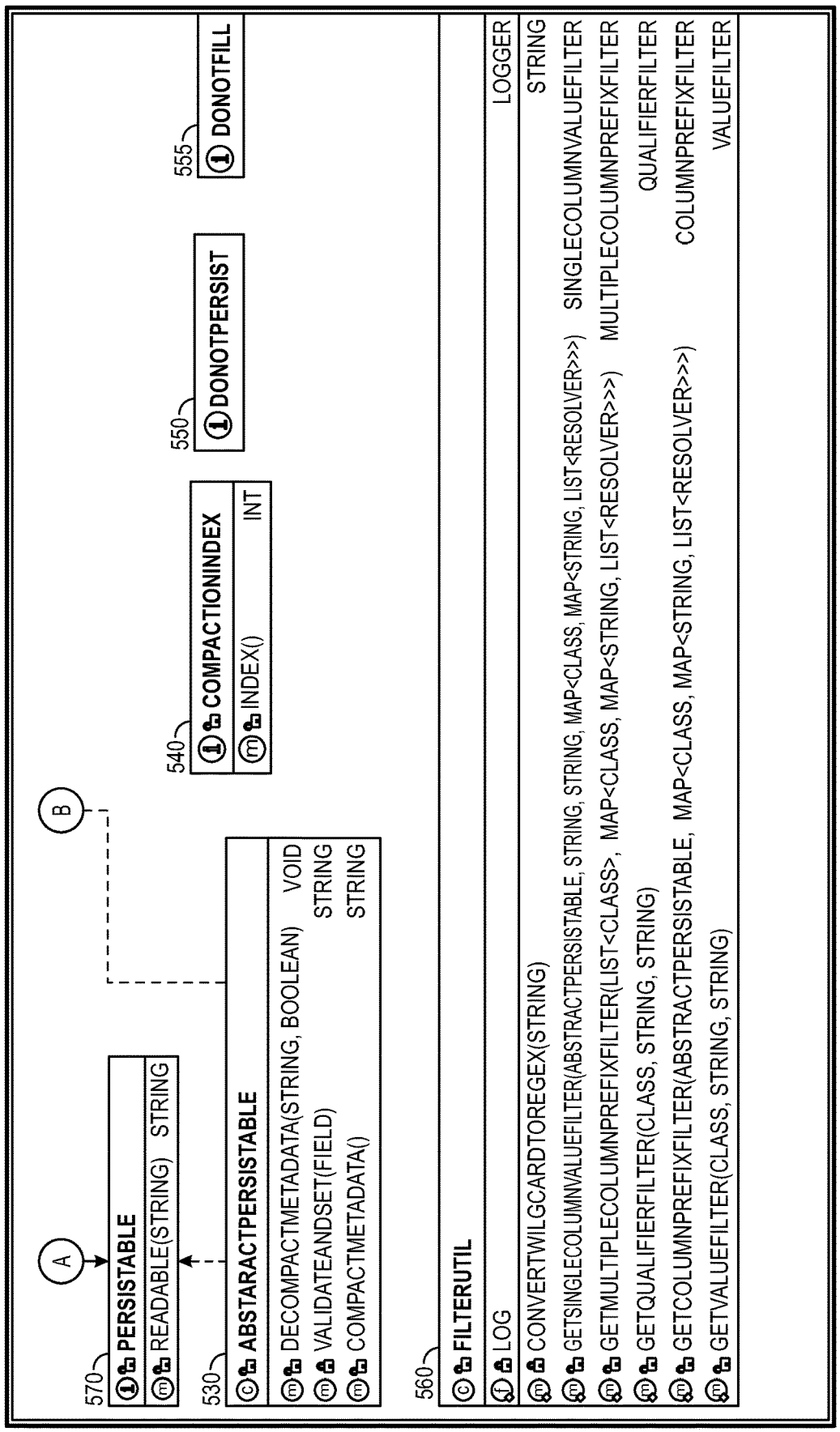
FIG. 5 is an object model diagram of an object model that can be used to support persistence and query engines according to some exemplary implementations.

FIG. 5 illustrates an object model usable with the MQS according to some exemplary implementations. A repository class (e.g., 505) and filtering utilities (e.g., 560) support the MQS, while a resolver class (e.g., 515) and resolver information class (e.g., 520) can be used by the MQS to map from objects and fields to the key-value store and back again.

Below are the annotations:

```
EmployerRepo extends Repo
    //these are used to construct / validate / maintain schema
    tableName = "employer"
    columnFamilies = {"data"}
    //these are referenced by our Objects to indicate where to
    store their scalar fields
    columnFamilyPersonNamePrefix = "n"
    columnFamilyCompanyNamePrefix = "c"
    columnFamilyEmployeePrefix = "e"
```

Non-scalar fields within an object may be declared by implementing Persistable, or if they carry Metadata for compaction, extending AbstractPersistable. In each object, the annotations indicate where the scalar fields should be stored (column qualifier or cell value (as compacted metadata)). Fields to be stored as metadata are annotated with @CompactionIndex, which indicates the order of compaction. Fields to be stored in the column qualifier are placed in the @ResolverInfo(tokenizedQualifiers) annotation.

Some implementations provide a set of interfaces and abstract classes to simplify persistence, read and query complex objects (e.g., Plain Old Java Objects, or "POJO") into and out of the deep key-value data store (e.g., HBase).

Each object hierarchy includes a root object from which other more specific objects are sub-classed. For example, in a Java system, the root object would extend the interface that defines the mapping functionality and defines any unique query or persistence logic or common constants (e.g., table names, column families, qualifier prefixes which may be referenced by multiple classes via resolver annotation). Resolver annotation can be mapping information that allows the MQS to automatically query or persist (i.e., read or write).

In one implementation, objects intended to be queryable or persistable by the MQS would implement a persistable base class (e.g., reference 570). If the object is also the root object, it would implement a root interface (e.g., reference 565) indicating its status as the root object. If the engine should store the object's fields as compacted metadata in a cell of the key-value data store, it would extend an abstract persistable interface (e.g., reference 530; supported by references 535 and 540). Thus:
  a) Any Object to persist, implement Persistable.
  b) If an Object is also the root object, implement Root.
  c) If Object's fields will be stored as compacted metadata in the cell, extend AbstractPersistable Additionally, if a field within the object should not be Persistable, it would, in some implementations, include a DoNotPersist annotation (e.g., reference 550); and if the query engine should skip populating a field of the object when read from the deep key-value store, it would be annotated with DoNotFill (e.g., reference 555). Similarly, if the MQS should organize an object in relation to other read objects, the class marker interface Organizable (e.g., reference 545) should be implemented.

Thus, objects that the MQS will query and persist should have annotation information in the class. With reference to FIG. 5, the annotation information includes resolver information that defines the bidirectional mapping between the object and the key/value store in the deep key-value data store. In the illustrated implementation, the annotation information is not executable instructions. An example of defining resolver info a Java-based implementation:
  a) Table: name of HBase table
  b) ColumnFamily: name of ColumnFamily in Table
  c) Tokenized qualifiers: column qualifier, tokenized with <fieldname> for any field you want to persist in the qualifier. Multiple tokenized qualifiers are allowed. Multiple fields are allowed in any qualifier.

The annotations for each field in the class definition of an object define how the engine will process the field when writing/persisting the object or reading/querying the object. Various types of annotations may be used:
  a) Write behavior:
    1) If the class implements Persistable (reference 570), each field in the class which is an object will be traversed, and each field which is scalar will be persisted by the MQS.
    2) If the MQS should not persist a field, the field may be annotated with a DoNotPersist annotation (e.g., reference 550).
    3) If the MQS should compact a field into a cell with the values of other fields ("compacted metadata"), the field can be annotated with the CompactionIndex (e.g., 540)

annotation, with the value unique and sequential across all the other CompactionIndex annotated fields in the class, starting with zero. Compacting the data into a single field can put the fields in sequence, one after the other, while the CompactionIndex allows the MQS to extract the compacted field values and store them in the correct fields in a restored object.

4) If a field does not get included in the tokenizedQualifier or in the compacted metadata, it will not be persisted.

b) Read behavior:

1) If the MQS should not populate a field when reading from the non-relational database, the field may be annotated with the DoNotFill annotation (e.g., reference 555).

2) If the MQS should perform custom processing reading in the value of a field, the field may be annotated with the ProvidesFillMethod and the identity of the method (which method must be implemented in the class). In one implementation, the MQS will execute the method when reading in the value of the field.

3) If the object should perform custom processing after all reads are complete, the class implements an Organizable marker interface, which causes the engine to call a custom implemented organize method after completing read operations for the object.

Exemplary pseudo code for annotating is the following:

```
@ResolverInfo(
    table = "employer"
    columnFamily = "data"
    tokenizedQualifiers = {
        columnQualifierCompanyNamePrefix + "<companyName>"
    }
}
Employer extends AbstractPersistable
    String companyName
    Employee employee
    @ResolverInfo(
        table = "employer"
        columnFamily = "data"
        tokenizedQualifiers = {
            columnFamilyEmployeePrefix + "<employeeId>"
        }
    }
Employee extends AbstractPersistable
    String employeeId
    Map<Language, Names>localizedNames
    @ResolverInfo(
        table = "employer"
        columnFamily = "data"
        tokenizedQualifiers = {
            columnFamilyPersonNamePrefix
        }
    }
Names extends AbstractPersistable
    @CompactionIndex(index=0)
    firstName
    @CompactionIndex(index=1)
    lastName
```

In some implementations, using annotations and custom methods to tailor the behavior of the MQS when persisting and querying objects, complex object trees can be efficiently mapped to a deep key-value data store. Additionally, the annotations allow for querying using metadata (e.g., class, field, expression) instead of using a specific set of predefined queries. The annotations and custom methods can be concealed from end users, reducing complexity while providing the opportunity to override the behavior as needed. Significant changes to the underlying storage can be simplified by changing the annotations.

Save

Saving an object happens at the root level. In one implementation, a root object implements the root interface, which inherits a rowKey field. This rowKey field is required before an object tree can be saved. The row key can be any value. In one implementation, an MD5 hash of the first part of the rowKey is used to avoid "hotspots"—lexicographic clumping that has deleterious effects on storage and retrieval efficiency. To save the Employer object related to the pseudo code above, one may call EmployerRepo.save (employer). The MQS may use the declarations and row key of the root object to dynamically populate the column qualifiers and compacted metadata into the HBase store.

Read

To read a stored object in the deep key-value database, one may request the root object by the row key. For example, to find an object in the HBase, a programmer may create an HBase scan object, providing the row key prefix she is looking for (this prefix can be part or all of the row key). The programmer may provide "hints" to the scanner in the form of HBase Filter objects. In Java Spring, one may use an HBaseTemplate object, pass it a table name, a Scan object, and an object that implements mapRow(result, rowNum) as the following:

```
hbaseTemplate.find(
    tableName,
    scan,
    (result, rowNum) -> new
    EmployerBuilder( ).mapRow(result, rowNum));
```

The result of the mapRow call returns a Persistable object. In our example, this is the Root object: Employer. The result of the find call returns a List<Persistable> containing all the Employers which satisfied the Scan.

Within the MQS, the mapRow implementation pulls all the column families, their contained column qualifiers, and their contained cell values. From here, mapRow reconstructs the object tree by applying the declarations in reverse order. Initially, it simply builds a Set of Persistable objects. Then by implementing the Organizable interface, the programmer may instruct the MQS how to arrange any of these objects in relation to each other. The organize method accepts the list of Persistables. When organize has determined it is complete, the next lifecycle method, organizeComplete( ) is called, where any final logic can be performed.

```
void organize(Collection<Persistable> collection);
void organizeComplete( );
```

Once the Persistables have been built and organized, they are built into the original object tree—their fields are "filled" from their mapped HBase locations. If there is any special logic that is needed during filling (e.g., converting a byte[ ] to a non-standard type) or if the programmer does NOT want a particular field filled (i.e., the field contains behavioral instructions instead of object data), the programmer may use the following annotations, respectively:

```
@ProvidesFillMethod
or
@DoNotFill
```

ProvidesFillMethod requires the programmer to provide a method named "fill<fieldname>". Once the set of objects is organized and filled, the structure is returned via the root object, and it is Employer in this example.

Query

The MQS may be used to query multiple objects stores in deep key-value data store. For example, HBase provides Filter classes which specialize in querying across the different key locations, from Table name through cell values. One structure is the following:

```
Table: fixed string
  Row Key: variable byte[ ]
    Column Family: fixed string, plus maximum number of cell
      versions allowed
      Column Qualifier: variable byte[ ]
        Timestamp: set when cell value is written
        Cell: variable byte[ ]
```

The MQS may use these Filters according to which one is appropriate for a given query of the Object tree. Because the MQS knows where a particular class and field are stored, both by HBase key type (e.g., Column Qualifier or Cell or Cell Metadata) and key name (e.g., a specific qualifier in the object's ResolverInfo), it can choose and build a Filter appropriate to that Scan. A programmer may provide the Object type (as a Class name), the fieldName to look for, and an expression to match against the scanned value. This triple can be provided as a hierarchical list and is evaluated like the HBase Filter list implementation (since each of them resolves to a specific Filter underneath) in one implementation. The pseudo code for such triple may be the following:

```
HBaseService.dynamicQuery([key
  parts], List<Clazz, fieldName, expression>)
```

If the programmer wants to find all employees in a specific Employer whose first name starts with Fred, the pseudo code may be the following:

```
HBaseService.dynamicQuery(<employerId key prefix>,
  Name.class, "firstName", "Fred*")
```

In one implementation, a field may be annotated with an indication which causes the MQS to not return its contents. For example, some information is personally identifiable information (PII) such as social security number. The pseudo code may be the following:

```
Names extends AbstractPersistable
  @CompactionIndex(index=0)
  firstName
  @CompactionIndex(index=1)
  lastName
  @CompactionIndex(index=2)
  @PII
  Social_security_number
```

Based on the declarations of @ResolverInfo and @CompactionIndex, the MQS knows that firstName in class of Name is the compacted metadata at index 0 in the cell where Name fields are stored. It builds a Scan using the EmployerId Prefix provided, and a CellValueFilter (HBase class) to scan the right places in HBase and then uses the READ functionality to return a List of Employer objects which contain Employees whose first names start with "Fred". Thus, the MQS hides the database details (the specific way that the objects are stored in HBase in this example) from a programmer, and the programmer only needs to request particular classes and fields that meet the query criteria, and the MQS will return the object containing the particular classes and fields from the database.

Cope with Object Update

To accommodate the addition a new field to a class, the programmer can simply add an annotation to the field to change the underlying schema in the deep key-value data store. Returning to a prior example, assume there is a class Names with fields firstName and lastName that has been in use. Then, a new field called salutation is added to the class Names. Rather than having to edit custom code to accommodate the change in the underlying schema of the key-value structure of the deep key-value store, the programmer simple can add a field annotation to the class. For example, changing the below example pseudo code from:

```
Names extends AbstractPersistable
  @CompactionIndex(index=0)
  firstName
  @CompactionIndex(index=1)
  lastName
```

To:

```
Names extends AbstractPersistable
  @CompactionIndex(index=0)
  firstName
  @CompactionIndex(index=1)
  lastName
  @CompactionIndex(index=2)
  salutation
```

In this example, only the compaction needs to be changed to accommodate the update to objects of this class. Such a change is backwards compatible since the existing compaction indices stays the same, and existing objects can still be written, read, and queried using the existing compaction indices. In one implementation, when the object without the added field is read, an indication may returned for the value of the added field, for example, when the added field is String, the indication may be UNSET; and when the added field is Long, the indication may be zero.

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 6A:
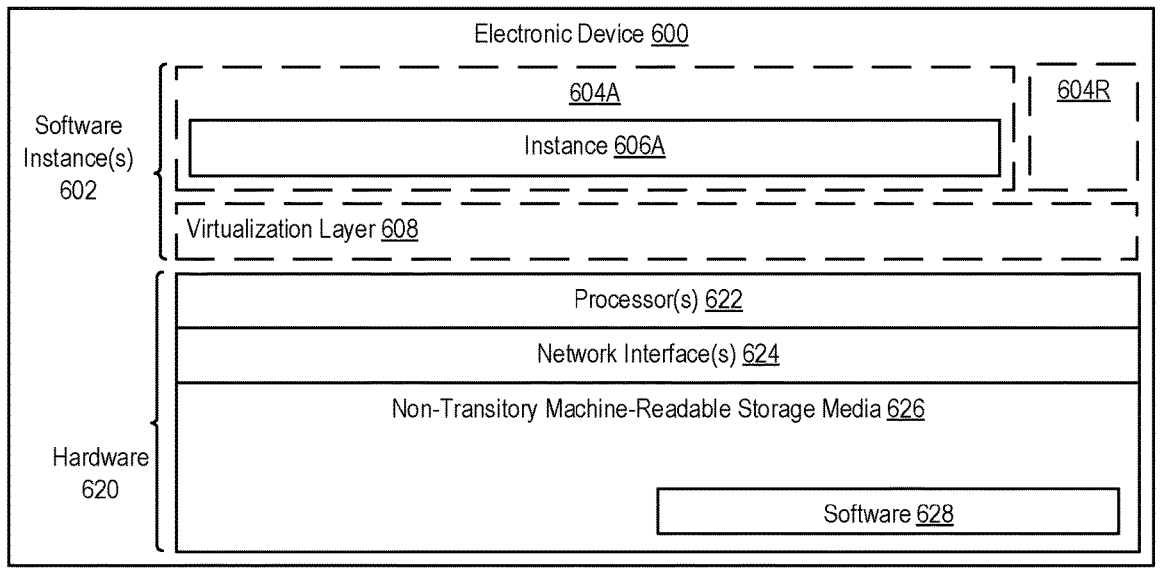
FIG. 6A is a block diagram illustrating an electronic device according to some exemplary implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and non-transitory machine-readable storage media 626 having stored therein software 628 (which includes instructions executable by the set of one or more processor(s) 622). Each of the previously described end user clients and the MQS 150 may be implemented in one or more electronic devices 600. In one implementation: 1) each of the end user clients is implemented in a separate one of the electronic devices 600 (e.g., in user electronic devices operated by users where the software 628 represents the software to implement end user clients to interface with the MQS 150 (e.g., a web browser, a native client, a portal, a command-line interface, and/or an application program interface (API) based upon protocols such as Simple Object Access Protocol (SOAP), Representational State Transfer (REST), etc.)); 2) the MQS 150 is implemented in a separate set of one or more of the electronic devices 600 (e.g., a set of one or more server electronic devices where the software 628 represents the software to implement the MQS 150); and 3) in operation, the electronic devices implementing the end user clients and the MQS 150 would be communicatively coupled (e.g., by a network) and would establish between them (or through one or more other layers) connections for submitting objects and/or queries to the MQS 150 and returning the requested reconstructed objects to the end user clients. Other configurations of electronic devices may be used in other implementations (e.g., an implementation in which the end user client and the MQS 150 are implemented on a single electronic device 600).

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 6B:
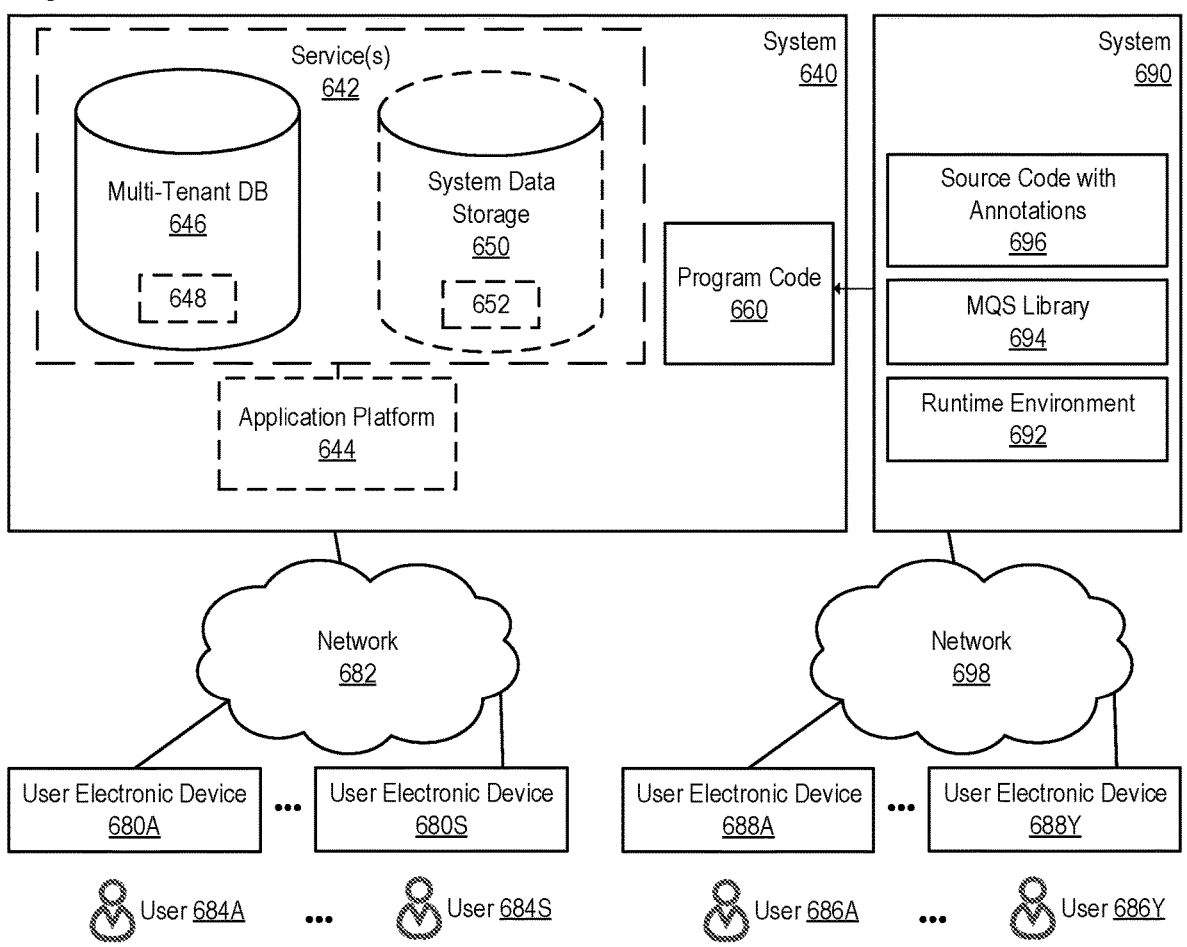
FIG. 6B is a block diagram of an environment where an MQS 150 may be deployed, according to some exemplary implementations.

FIG. 6B is a block diagram of an environment where the MQS service may be deployed, according to some implementations. A system 640 includes hardware (a set of one or more electronic devices) and software. The system 640 is coupled to user electronic devices 680A-S over a network 682. The user electronic devices 680A-S are operated by users 684A-S.

A system 690 includes hardware (as set of one or more electronic devices) and software. The software includes a runtime environment 692 (such as a Java virtual machine and/or source code for a Java virtual machine), an MQS library 694 (e.g., Java code that implements the MQS 150), and source code with annotations 696 (e.g., source code 104 with annotations 130). The system 690 is coupled to user electronic devices 688A-Y over a network 698 (which may be the same or a different network as network 682) for a set of users 686A-Y to develop software, such as source code with annotations 696. When ready, an executable is generated based on this software and provided as at least part of program code 660 on the system 640. As such, the program code 660 will provide the MQS 150 to persist objects in a key-value data store provided as part of a multi-tenant database 646 in system 640. The storage and retrieval of objects is responsive to instructions from the users 684A-S and/or other services/applications on system 640.

The term "user" is a generic term referring to an entity (e.g., an individual person) using a system and/or service. The system 640 may provide service(s) 642, which may be on-demand services that are made available to one or more of the users 684A-S working for one or more other organizations (sometimes referred to as outside users) so that those organizations do not need to necessarily be concerned with building and/or maintaining a system, but instead makes use of the service(s) 642 when needed (e.g., on the demand of the users 684A-S). The service(s) 642 may communicate with each other and/or with one or more of the user electronic devices 680A-S via one or more Application Programming Interface(s) (APIs) (e.g., a Representational State Transfer (REST) API).

A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

In one implementation, the system 640 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 640 may include an application platform 644 that enables PAAS for creating, managing, and executing one or more applications developed by the provider of the application platform 644, users accessing the system 640 via one or more of user electronic devices 680A-S, or third-party application developers accessing the system 640 via one or more of user electronic devices 680A-S.

In some implementations, one or more of the service(s) 642 may utilize one or more multi-tenant databases 646 for tenant data 648, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user electronic device 680A-S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the one or more multi-tenant database 646 and/or system data storage 650.

In some implementations, the service(s) 642 are implemented using virtual applications dynamically created at run time responsive to queries from the user electronic devices 680A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may also be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Networks 682 and 698 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 640 and the user electronic devices 680A-S.

Each user electronic device 680A-S (such as a desktop personal computer, workstation, laptop, Personal Digital Assistant (PDA), smartphone, etc.) typically includes one or more user interface devices, such as a keyboard, a mouse, a trackball, a touchpad, a touch screen, a pen or the like, for interacting with a graphical user interface (GUI) provided on a display (e.g., a monitor screen, a liquid crystal display (LCD), etc.) in conjunction with pages, forms, applications and other information provided by system 640. For example, the user interface device can be used to access data and applications hosted by system 640, and to perform searches on stored data, and otherwise allow a user 684 to interact with various GUI pages that may be presented to a user 684. User electronic devices 680A-S might communicate with system 640 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 680A-S might include an HTTP client, commonly referred to as a "browser," for sending and receiving HTTP messages to and from server(s) of system 640, thus allowing users 684 of the user electronic device 680A-S to access, process and view information, pages and applications available to it from system 640 over network 682.

In the context of FIG. 6B, the MQS 150 service could be used in a variety of contexts. More specifically, places where it is desirable to store and retrieve objects from a deep key-value store, such as cases where there is: 1) an ability to anticipate the kinds of queries needed and an expectation that the platform will need to store a volume of data best suited for deep key-value stores; and 2) a desire to enable developers to modify the objects (e.g., Java objects) without needing to update the deep key-value store schema or update any of the read/write code directly. By way of particular example, see FIG. 7.

Figure 7:
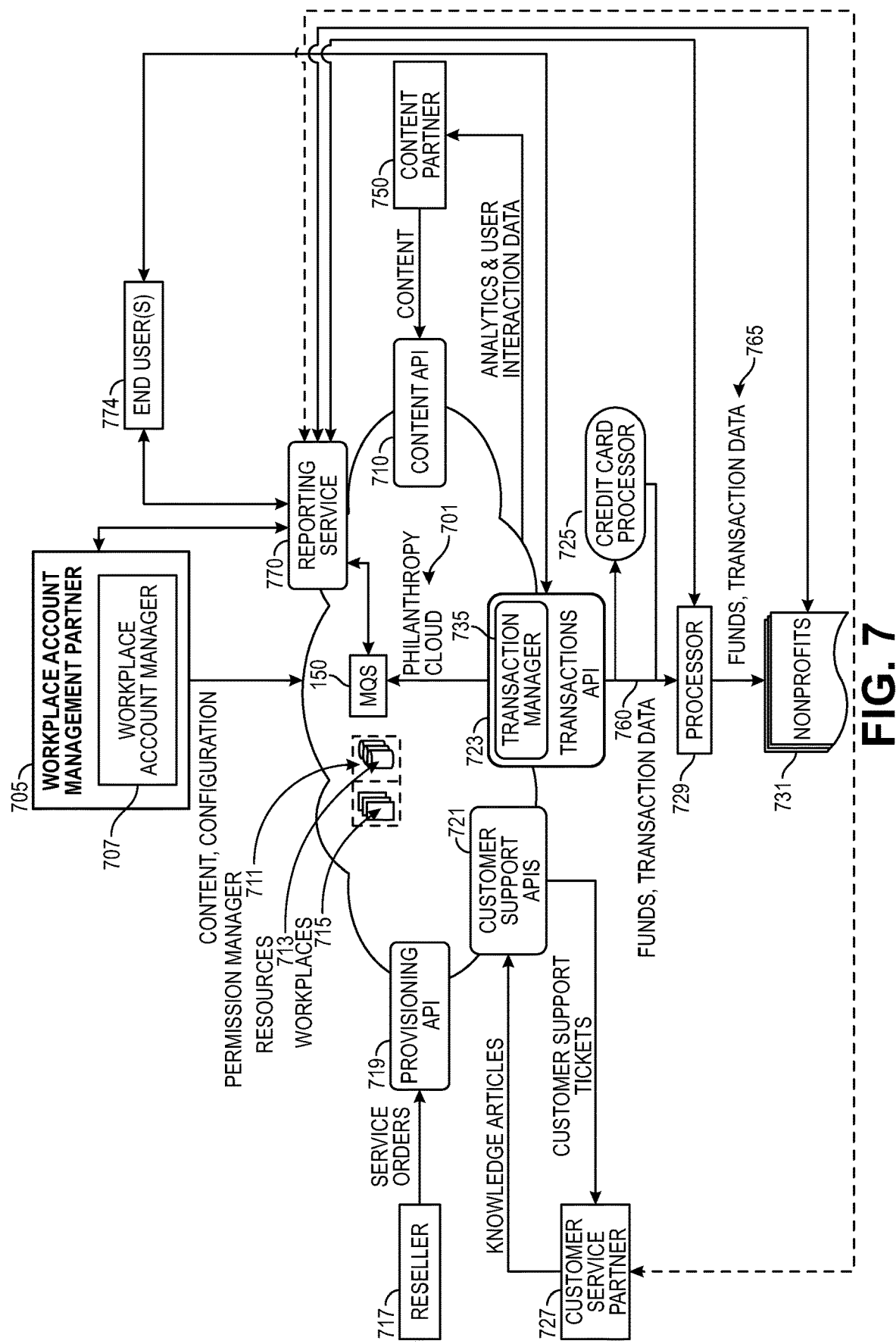
FIG. 7 is a block diagram illustrating a philanthropy cloud platform, in which an MQS service can be used, that implements a corporate social responsibility programs with support for external organizations to have defined supporting roles to facilitate the corporate social responsibility programs according to some exemplary implementations.

FIG. 7 is a block diagram illustrating a philanthropy cloud platform, in which an MQS service can be used, that implements a corporate social responsibility programs with support for external organizations to have defined supporting roles to facilitate the corporate social responsibility programs according to some exemplary implementations. In some implementations, the platform in FIG. 7: 1) records donations, including the status of a given donation as it changes over time (e.g., pledged, paid, disputed, refunded . . . ); and 2) reports, in real-time, on these donations as well. Thus, some implementations provide the MQS 150 and a deep key-value store (not shown) to persist objects that represent the donations because a deep key-value store is relatively well suited for the platform in FIG. 7. For instance: 1) there is an ability to anticipate the kinds of queries needed (e.g., all donations in a workplace, all donations for a person in a workplace, all donations for a person in a workplace between dates x and y, a donation for a workplace for a person at date z) and an expectation that the platform of FIG. 7 will need to store a volume of data best suited for deep key-value stores; and 2) a desire to enable developers to modify the objects (e.g., Java objects) without needing to update the deep key-value store schema or update any of the read/write code directly (e.g., because there is a potential for the need to add features that require changes in the reports to be generated and/or the addition of new fields to the objects); and 3) HBase because it is relatively well-suited as both an analytics and event store— it works very well with historical data, where you always write or read (and never update). The MSQ allows for the addition of a field to be persisted in HBase by simply adding it to the class and annotating where it should go. Also, to generate new types of reports, the structure of the donation object tree can be modified without having to do any schema modifications or low level code to talk to HBase.

The philanthropy cloud 701 allows end user(s) 774 to submit donations via a transactions API 723; and responsive to these donations, donation objects are instantiated and the MQS 150 is instructed to persist those objects. The philanthropy cloud 701 allows includes a reporting service 770, which may be used by various entities (e.g., end user(s) 774) to request and receive reports. To generates these reports, the reporting service 770 interacts with the MQS 150 to retrieve and reconstruct the needed donation objects to generate the requested reports and transmit them to the appropriate recipients (e.g., the requester).

In one implementation, the following is used:

```
@ResolverInfo(
    table = TABLE_NAME_ROOT,
    columnFamily = CF_DATA_COLUMN_PREFIX,
    tokenizedQualifiers = {PREFIX_COLUMN_TYPE_DATA + "date"}
)
Donation implements Persistable, Root
String rowKey
@compositeKeyIndex=2
Long createdDate
Workplace workplace
Person person
@ProvidesFillMethod
Content contentRoot
//the fill method for contentRoot above
public void fillContentRoot(Collection<Persistable> collection)
{
    for (Persistable persistable : collection) {
        if (persistable instanceof ContentNode) {
            if (((ContentNode) persistable).getParent( ) == null) {
                this.setContentRoot((ContentNode) persistable);
                break;
            }
        }
    }
}
```

```
    @ResolverInfo(
       table = TABLE_NAME_ROOT,
       columnFamily = CF_DATA_COLUMN_PREFIX,
       tokenizedQualifiers = {
          PREFIX_COLUMN_TYPE_KEY_METADATA
             + QUALIFIER_DELIMITER
             + "<taxonomy>"
       }
    )
    Content
    @DoNotPersist
    @DoNotFill
    private ContentNode parent;
    private String taxonomy;
    public void organize(Collection<Persistable> collection) {
       for (Persistable item : collection) {
          //code to look for our parent (they reference us as a child)
          //and set our parent field above
       }
    }
    public void organizeComplete( ) {
       buildTaxonomy( );
    }
    @ResolverInfo(
       table = TABLE_NAME_ROOT,
       columnFamily = CF_DATA_COLUMN_PREFIX,
       tokenizedQualifiers = {PREFIX_COLUMN_TYPE_DATA +
    "<workplaceId>"}
    )
Workplace implements Persistable
    @compositeKeyIndex=0
    String workplaceId
    @CompactionIndex(index = 0)
    String workplaceName
    @CompactionIndex(index = 1)
    String workplaceAddress
    @ResolverInfo(
       table = TABLE_NAME_ROOT,
       columnFamily = CF_DATA_COLUMN_PREFIX,
       tokenizedQualifiers = {PREFIX_COLUMN_TYPE_DATA +
    "<personId>"})
Person implements Persistable
    @compositeKeyIndex=1
    String personId
    @CompactionIndex(index = 0)
    String personName
    @CompactionIndex(index = 1)
    String personAddress
```

The philanthropy cloud platform supports roles that are implemented by entities external the philanthropy cloud platform. Any number of supporting roles can be defined for a philanthropy cloud platform. Example supporting role implementations can include a reseller, customer support partner, processor, content partner, and workplace account manager. An organization with a 'reseller' role markets the philanthropy cloud platform to interested customers, culminating in a contract and service order submitted to the provider of the philanthropy cloud platform. The reseller provides sales enablement and marketing support to partners in the philanthropy cloud platform.

An organization with the 'customer service partner' role provides technical support to tenant organizations, workplaces, and associated users in the philanthropy cloud platform. The customer service partner can also escalate issues to the philanthropy cloud platform provider when the customer service partner is not able to resolve the issues themselves. An organization with a role of a workplace account management partner provides account management services to tenant organizations, workplaces, and associated users, including critical tasks such as user onboarding and education, campaign content development, campaign outreach/marketing to tenant organization users, campaign reporting and strategic campaign management. In the philanthropy cloud platform, tenants in the underlying multi-tenant cloud computing system are structured as organizations, with a set of workplaces. These tenant organizations have associated resources, users, and roles assigned to these users that are used to define access to resources for the users within a workplace.

In some implementations, support roles also include a transaction processor, which is an organization that assists in the processing of donated funds from employees (e.g., users of a tenant organization), and as needed, may pass through such funds to a beneficiary charitable organization (i.e., a nonprofit) designated by the donor (i.e., the tenant organization user). The transaction processor manages accounting, legal, and banking logistics to ensure proper handling of donations and the related financial transactions for the philanthropy cloud, workplaces, and the beneficiaries (e.g., non-profits).

The support roles also include content partners. Content or service partners are organizations and associated users that create or curate content for workplaces in the philanthropy cloud platform. The content can be any type of audio, graphical, video, interactive or similar content. The content partner can design the content to be descriptive, persuasive, or similar content to support charitable campaigns and corporate social responsibility programs for tenant organizations.

The philanthropy cloud platform allows these support roles to be independently assigned to appropriate organizations external to the philanthropy cloud platform and allows individual users in these organizations to access affordances for performing specific tasks that are appropriate to each of their roles and responsibilities in the overall system. A single organization and/or associated user may hold one or more support roles in connection with a tenant organization in the philanthropy cloud platform.

The philanthropy cloud platform 701 is a multi-tenant cloud computing system. The philanthropy cloud platform includes any number of electronic devices, storage devices and similar resources to provides services to its tenant organizations who are represented within the philanthropy cloud platform using an object model and by associating tenant organizations with a set of 'workspaces' 715. The workplaces 715 encompass a set of users, services, and resources associated with a tenant organization, for example a corporation can be a tenant organization that utilizes the philanthropy cloud platform 701 for corporate social responsibility programs for its employees. A given corporation may have sub-divisions or similar corporate structures such that users and resources are separated into different workplaces 715. The resources 713 within the philanthropy cloud platform 701 can include databases storing content and data for the corporate social responsibility program. A permission manager 711 can manage access to the resources 713 by enforcing policies whereby users have limited access to the resources 713 based on associated attributes as discussed further herein below.

The philanthropy cloud platform 701 enables supporting roles that are external to the philanthropy cloud platform 701 by providing a corresponding application programming interface (API) or similar access mechanism through which the organizations and associated users that are operating in these supporting roles can access the resources 713 of the philanthropy cloud platform 701. Each API services access requests from the external systems of organizations serving in supporting roles and upon approval of the permission manager 711 enables the external systems to access resources 713 of the philanthropy cloud platform 701 to carry out the functions of the associated supporting role. For supporting roles of reseller, customer service partner, transaction processor, content partner, and workplace account management partner, respective APIs can be defined such as provisioning API 719, customer support API 721, transaction API 723, content creation API 710, and configuration API 745, respectively.

The implementation of the philanthropy cloud platform 701 enables tenant organizations, their workplaces, and their users to not have to depend on a single vendor or provider for all of the different services/aspects of running a corporate social responsibility program that are handled by the supporting roles. The philanthropy cloud platform 701 enables these responsibilities to be formalized and disentangled from each other such that tenant organizations, their workplaces, and their users can have a choice of providers for these supporting roles, increasing efficiency and service quality while decreasing cost. The philanthropy cloud platform 701 can thereby create a vigorous, healthy market ecosystem of organizations offering different kinds of services to the philanthropy cloud platform tenant organizations, users, and workplaces.

The term "user," as used with regard to this figure, is a generic term referring to an entity (e.g., an individual person) using a system and/or service. A multi-tenant architecture provides each tenant with a dedicated share of a software instance and the ability to input tenant specific data for user management, tenant-specific functionality, configuration, customizations, non-functional properties, associated applications, and similar functionality. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, or similar entity) referred to herein as a tenant organization. A tenant organization in the philanthropy cloud platform may have one or more support roles defined to provide functions for a corporate social responsibility program.

A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

In the philanthropy cloud platform 701, the tenant organizations may be represented as a set of workplaces 715 that are participating in a corporate social responsibility program. As discussed above, the corporate social responsibility program can be divided into supporting roles for handling different functions related to the operation of the corporate social responsibility program: a reseller, a customer service partner, a workplace account manager, a transaction processor, and a content partner. The philanthropy cloud platform 701 allows these roles to be independently assigned to any number and configuration of appropriate organizations and allows individual users in these organizations to be able to access resources sufficient to perform specific tasks that are appropriate to each of their roles and responsibilities in the overall philanthropy cloud platform 701. Any of these organizations and their users may hold one or more supporting roles as determined by the tenant organizations and/or the philanthropy cloud platform 701 using a defined object model and a permissions manager 711 to ensure that organizations and users have access to resources according to their supporting roles and relationships with tenant organizations within the philanthropy cloud platform 701.

For example, a single entity A 755 can serve as a reseller 717 and a customer service partner 727 for a single tenant organization or workspace 715 or for multiple tenants or workspaces 715. In other cases, a single entity, e.g., Entity B 753 or Entity C 751 can serve in the supporting role of a transaction processor 729 or content partner 750, respectively. Any number of entities can operate in any given role or in any combination of possible roles to provide a competitive and robust environment for tenants or workplaces to obtain the functions and services associated with that supporting role. An 'entity,' as used herein can be any legal entity, such as an organization (e.g., a corporation or non-profit) or an individual. The supporting roles can also be subdivided within an organization that is providing the service. The organization can have sub-divisions and users that may operate with a particular supporting role within the set of supporting roles.

In one implementation, organizations serving as resellers 717 in support of a philanthropy cloud platform 701 market and advertise the functions and services of the philanthropy cloud platform 701 to offer these services to other parties who can become new tenants of the philanthropy cloud platform 701. The resellers 717 include reseller systems that are a set of electronic devices configured and managed by the reseller 717 that execute client software or general-purpose software for interfacing with the philanthropy cloud platform 701. The reseller 717 is granted permission to instantiate service orders through a provisioning API 719. The reseller systems thereby are granted access to the philanthropy cloud platform 701 to configure new tenants and workspaces 715 for these tenants as well as to define the access of these new tenants to the resources 713 of the philanthropy cloud platform 701.

Each tenant or workspace 715 can be assigned to a customer service partner 727. The customer service partner 727 is connected to the philanthropy cloud platform 701 through a customer support API 721. The customer support API 721 can provide functions for accessing resources related to customer services, such as a relational database engine in which customer support tickets are stored and knowledge articles are stored. In one implementation, each customer service partner 727 is associated with one or more support ticketing systems. The philanthropy cloud platform 701 can dynamically route user support cases originating with tenants and their users to the appropriate support ticketing system based on a customer service partner associated with the tenant in the object model. The support ticketing system can queue submitted tickets for action by the customer service partner's 727 customer support agents 771.

The customer service partner 727 system allows associated tenant or workplace users to view and interact with their support tickets and allows customer support agents 771 limited access to the philanthropy cloud platform 701 and the workplaces 715 to troubleshoot issues on behalf of the users of the associated workplaces 715. In addition, the philanthropy cloud platform 701 can index support documentation from across multiple customer service partners 727, support ticketing systems, and correlated systems to present appropriate documentation resources to each workplace user of the philanthropy cloud platform 701. Thus, the customer service partner 727 and the customer support APIs 721 can support multiple workplaces 715, multiple specific software products, multiple resources, and similar aspects of the philanthropy cloud platform 701 to assist any number or workplace 715 users across multiple workplaces.

In some implementations, each tenant organization is also assigned a workplace account management partner 705 through a configuration API 745. The configuration API 745 can provide access in accordance with the permissions manager 711 to resources 713 such as relational database engines. Workplace account management partners 705 can assign individual workplace account managers 707 to a tenant organization or workplace 715. Workplace account managers 707 have certain administrative permissions for tenant organization workplaces 715 and can assist tenant organization users and administrators with configuration and content creation tasks within these workplaces 715. A workplace account management partner 705 can be associated with any number of tenant organizations and related workplaces 715. A workplace account manager 707 can be a user of the workplace account management partner 705 that is specific to a workplace 715 or that assists multiple workplaces 715.

In some implementations, each tenant organization or workplace 715 is assigned a default intermediary transaction processor 729. Transaction processors 729 connect a payment processing account to the philanthropy cloud platform 701 and can then receive charitable donations from workplace 715 users and, outside of the philanthropy cloud platform 701, can subsequently pass the donations through to additional nonprofits 731 that the user may designate. Individual nonprofits 731 can also onboard as transaction processors 729 and receive donations directly. In the event that there are multiple intermediary transaction processors 729, a transaction manager 735 tracks which nonprofits 731 each intermediary transaction processor 729 can distribute to, and their cost for doing so. In this manner, the philanthropy cloud platform 701 can choose the most efficient/lowest-cost option for routing funds to a given nonprofit 731. Transaction processors 729 can work with banks, credit card companies, and similar financial institutions 725 to coordinate the processing of donations and related transactions based on tenant organization, workplace 715, or user preference.

In some implementations, the philanthropy cloud platform 701 is open to multiple content partners 750 and/or similar service providers. Content partners 750 and/or similar service providers can create content on the philanthropy cloud platform 701 via a user interface (UI) or via a content creation API 710 and can retrieve information about workplace 715 user interactions/transactions with their content (donations, sign ups, etc.) through several APIs. A content partner 750 can provide content for any number of workplaces 715 as determined by the permission manager 711 and the preferences of the workplaces 715 on sharing content of the content partner 750. Any number of content partners 750 can provide content that is accessible to any number of workplaces 715 and workplace users as managed by the permission manager 711. In addition, content partners 750 can receive analytics and user interaction data from the philanthropy cloud platform 701 that is collected by the platform 701, workplaces 715, and resources 713 that enable the content partner to track user participation and similar metrics of user consumption of the content.

Enabling these supporting roles to have external managed access to the resources 713 of the philanthropy cloud platform 701 provides a platform with an innovative combination of components in the context of managing corporate social responsibility programs and individual engagement with charitable causes generally. Further, the transaction manager 735 implementation of a lowest-cost funds routing of transactions or similar tenant or tenant user preference based routing is an improvement in the routing of charitable donations to nonprofits 731.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method to implement a store operation for a mapping and query service that supports storage of a set of one or more objects having classes and fields written in source code of an object-oriented programming language in a deep key-value data store, the method comprising:
   receiving, by the mapping and query service, a request to store an object in a key-value store;
   accessing, by the mapping and query service, class annotations from metadata of source code for a class from which the object was instantiated, wherein the class annotations define a table name, a column family, and a column qualifier;
   generating, by the mapping and query service, an in-memory tree that includes the table name, the column family, and the column qualifier defined by the class annotations;
   sending, by the mapping and query service, a put command to the key-value data store to store the in-memory tree in a key-value structure in the key-value data store; and
   responsive to receiving a request to retrieve the object from the key-value store, sending, by the mapping and query service, a get command to the key value data store to obtain key-value pairs and reconstructing the object using the key-value pairs, the class annotations, and field annotations, wherein the reconstructing includes instantiating the object and filling fields of the object using compaction indexes included in the field annotations.

2. The method of claim 1, further comprising:
generate a row key to use for the object in the key-value store.

3. The method of claim 1, further comprising:
generate a column qualifier to for the key-value store.

4. The method of claim 1, further comprising:
generate a data structure to store at least one scalar field with a compaction index annotation in the key-value store.

5. The method of claim 1, further comprising:
determining whether at least one field stores another object for which the class includes a persistable interface.

6. The method of claim 5, further comprising:
adding at least one field that stores another object for which the class includes a persistable interface to the in-memory tree.

7. The method of claim 1, wherein each field that stores another object is added to in-memory tree in a recursive process.

8. An electronic device to execute a method to implement a store operation for a mapping and query service that supports storage of a set of one or more objects having classes and fields written in source code of an object-oriented programming language in a deep key-value data store, the electronic device comprising:
   a non-transitory machine-readable medium to store a store engine; and
   a processor coupled to the non-transitory machine-readable medium, the processor to execute the store engine, the store engine to receive a request to store an object in a key-value store, to access class annotations from metadata of source code for a class from which the object was instantiated, wherein the class annotations define a table name, a column family, and a column qualifier, to generate an in-memory tree that includes the table name, the column family, and the column qualifier defined by the class annotations, to send a put command to the key-value data store to store the in-memory tree in a key-value structure in the key-value data store, to receive a request to retrieve the object from the key-value store, to send a get command to the key value data store to obtain key-value pairs, and to reconstruct the object using the key-value pairs, the class annotations, and field annotations, wherein the reconstruction involves instantiating the object of the class and filling fields of the object using compaction indexes included in the field annotations.

9. The electronic device of claim 8, wherein the store engine is further to generate a row key to use for the object in the key-value store.

10. The electronic device of claim 8, wherein the store engine is further to generate a column qualifier to for the key-value store.

11. The electronic device of claim 8, wherein the store engine is further to generate a data structure to store at least one scalar field with a compaction index annotation in the key-value store.

12. The electronic device of claim 8, wherein the store engine is further to determine whether at least one field stores another object for which the class includes a persistable interface.

13. The electronic device of claim 12, wherein the store engine is further to add at least one field that stores another object for which the class includes a persistable interface to the in-memory tree.

14. The electronic device of claim 8, wherein each field that stores another object is added to in-memory tree in a recursive process.

15. An article of manufacture comprising:
   a non-transitory machine-readable storage medium that provides instructions that, if executed by an electronic device, will cause the electronic device to perform operations
   of a method to implement a store operation for a mapping and query service that supports the storage of a set of one or more objects having classes and fields written in source code of an object-oriented programming language in a deep key-value data store, the operations comprising:
   receiving a request to store an object in a key-value store;
   accessing class annotations from metadata of source code for a class from which the object was instantiated, wherein the class annotations define a table name, a column family, and a column qualifier;
   generating an in-memory tree that includes the table name, the column family, and the column qualifier defined by the class annotations;
   sending a put command to the key-value data store to store the in-memory tree in a key-value structure in the key-value data store; and
   responsive to receiving a request to retrieve the object from the key-value store, sending, by the mapping and query service, a get command to the key value data store to obtain key-value pairs and reconstructing the object using the key-value pairs, the class annotations, and field annotations, wherein the reconstructing includes instantiating the object of the class and filling fields of the object using compaction indexes included in the field annotations.

16. The article of manufacture of claim 15, wherein the operations further comprise:
generate a row key to use for the object in the key-value store.

17. The article of manufacture of claim 15, wherein the operations further comprise:
   generate a column qualifier to for the key-value store.

18. The article of manufacture of claim 15, wherein the operations further comprise:
   generate a data structure to store at least one scalar field with a compaction index annotation in the key-value store.

19. The article of manufacture of claim 15, wherein the operations further comprise:
   determining whether at least one field stores another object for which the class includes a persistable interface.

20. The article of manufacture of claim 19, wherein the operations further comprise:
   adding at least one field that stores another object for which the class includes a persistable interface to the in-memory tree.

21. The article of manufacture of claim 15, wherein each field that stores another object is added to in-memory tree in a recursive process.

\* \* \* \* \*